(12) United States Patent
Santander Kuborn

(10) Patent No.: US 11,333,387 B2
(45) Date of Patent: May 17, 2022

(54) METHOD FOR TRANSFERRING HEAT BETWEEN TWO OR MORE MEDIA AND SYSTEM FOR CARRYING OUT SAID METHOD

(71) Applicant: Energy Innovation Systems Limited, Hong Kong (HK)

(72) Inventor: Jean Baptiste Claudio Santander Kuborn, Lo Barnechea (CL)

(73) Assignee: Energy Innovation Systems Limited, Hong Kong (HK)

( * ) Notice: Subject to any disclaimer, the term of this patent is extended or adjusted under 35 U.S.C. 154(b) by 0 days.

(21) Appl. No.: 16/772,724

(22) PCT Filed: Dec. 27, 2018

(86) PCT No.: PCT/CL2018/050156
§ 371 (c)(1),
(2) Date: Jun. 12, 2020

(87) PCT Pub. No.: WO2019/126899
PCT Pub. Date: Jul. 4, 2019

(65) Prior Publication Data
US 2020/0318848 A1    Oct. 8, 2020

(30) Foreign Application Priority Data
Dec. 29, 2017 (CL) .................................. 3498-2017

(51) Int. Cl.
F24F 11/83 (2018.01)
F24F 1/0059 (2019.01)

(52) U.S. Cl.
CPC ............ *F24F 11/83* (2018.01); *F24F 1/0059* (2013.01)

(58) Field of Classification Search
CPC . F24F 11/83; F24F 1/0059; F25B 1/00; F25B 1/02; F25B 9/14; F25B 13/00; F25B 25/00; F25B 25/02; F25B 27/00; F25B 27/02; F25B 29/00; F25B 30/00; F25B 30/02; Y02P 80/10; Y02A 30/274
See application file for complete search history.

(56) References Cited

U.S. PATENT DOCUMENTS 2,986,907 A    6/1961  Hoop
5,025,627 A *  6/1991  Schneider ................. F03G 7/06
                                                    60/527
(Continued)

FOREIGN PATENT DOCUMENTS

CL    201701096    1/2018
CN    1475545      2/2004
(Continued)

OTHER PUBLICATIONS

Chen et al., Portable Manual Compression Type Coldness Storage Power-Supply-Free Refrigeration Device, Nov. 26, 2014, CN203964549U, Whole Document (Year: 2014).*
(Continued)

*Primary Examiner* — Larry L Furdge

(57) ABSTRACT

A method for producing heat transfer between two or more media and a device or system for carry out said method, usable for air conditioning a space, or any use that requires heat transfer between two or more media to be used for domestic, commercial or industrial use.

13 Claims, 17 Drawing Sheets

(56) References Cited

U.S. PATENT DOCUMENTS

| | | | |
|---|---|---|---|
| 5,087,190 A * | 2/1992 | Laghi | B29C 45/12 |
| | | | 425/145 |
| 5,099,651 A | 3/1992 | Fischer | |
| 5,177,969 A * | 1/1993 | Schneider | B25J 9/14 |
| | | | 60/527 |
| 5,636,521 A | 6/1997 | Rosenthal | |
| 6,145,818 A * | 11/2000 | Herbst | F28D 5/02 |
| | | | 261/154 |
| 2008/0190131 A1 * | 8/2008 | Giallombardo | F24F 1/48 |
| | | | 62/324.5 |
| 2010/0089063 A1 * | 4/2010 | McBride | F15B 21/14 |
| | | | 60/682 |
| 2010/0133903 A1 * | 6/2010 | Rufer | F02C 6/16 |
| | | | 307/22 |
| 2010/0263392 A1 | 10/2010 | Misselhorn | |
| 2012/0324935 A1 * | 12/2012 | Piechowski | F24F 1/0007 |
| | | | 62/291 |
| 2014/0053544 A1 | 2/2014 | Dincer et al. | |
| 2016/0047362 A1 * | 2/2016 | Dunham | F03G 7/05 |
| | | | 60/641.7 |
| 2017/0096044 A1 * | 4/2017 | Kim | B60N 2/5685 |

FOREIGN PATENT DOCUMENTS

| | | | |
|---|---|---|---|
| CN | 203964549 U | * | 11/2014 |
| FR | 2468086 | | 4/1981 |
| TW | I461520 | | 11/2014 |
| WO | 2013175302 A2 | | 2/2016 |
| WO | 2016186572 A1 | | 11/2016 |

OTHER PUBLICATIONS

Revised Release on the Pressure along the Melting and Sublimation Curves of Ordinary Water Substance IAPWS R14-08 (2011) http://www.iapws.org.

M. Choukrounia and O. Grasset, Thermodynamic model for water and high-pressure ices up to 2.2 GPa and down to the metastable domain, J. Chem. Phys. 127 (2007) 124506.

M. P. Verma, Steam tables for pure water as an ActiveX component in Visual Basic 6.0, Computers Geosci. 29 (2003) 1155-1163.

Equations of state of ice VI and ice VII at high pressure and high temperature citation The journal of chenical physics 141, 104505 (2014)).

Time-resolved x-ray diffraction across water-ice-VI/VII transformations using the dynamic-DAC, Journal of Physics: Conference Series 500 (2014) 142006.

G. C. León, S. Rodriguez Romo and V. Tchijov, Thermodynamics of high-pressure ice polymorphs: ice II, Journal of Physical Chemistry Solids 63 (2002) 843-851.

Formulations for vapor pressure, frostpoint temperature, dewpoint temperature, and enhancement factors in the range −100 to +100 C, Bob Hardy, The Proceedings of the Third International Symposium on Humidity & Moisture, Teddington, London, England, Apr. 1998.

Pauling "The Structure of Water", Hydrogen Bonding: 1-6, 1959.

* cited by examiner

METHOD FOR TRANSFERRING HEAT BETWEEN TWO OR MORE MEDIA AND SYSTEM FOR CARRYING OUT SAID METHOD

FIELD OF THE INVENTION

The present invention relates to a heat transfer system, through a cylinder/piston closed system or the like, in whose closed chamber, there is a fluid that is sensitive to the change in temperature outside said chamber, wherein said fluid changes state when said fluid absorbs or release heat. More specifically, the present invention relates to a method for producing heat transfer between two or more media and a system for carrying out said method, usable for air conditioning a space, or any use that requires heat transfer between two or more media, allowing a domestic, commercial or industrial use.

BACKGROUND OF THE INVENTION

Currently, there are many technologies producing heat transfer for air-conditioning a space, but they require a large amount of energy in order to allow absorbing or delivering a determined amount of energy, further the use of cooling liquids damaging for the environment. For instance, there are heat pumps using coolants that affect the ozone layer or produce greenhouse effect. For instance, there are CFCs or chlorofluorocarbons, inert gases derived from saturated hydrocarbons, which remain in the atmosphere between 50 and 100 years and degrade when combined with ozone from the stratosphere releasing chlorine atoms.

After the damage from CFCs to the ozone layer had been verified, they were replaced by HFCs or hydrofluorocarbons, fluorinated gases that contribute to the greenhouse effect and global warming of the planet.

An example of CFCs is Freon, which is evaporated in the cyclical process of heat transfer, this type of substance is currently being replaced by alternative refrigerants, which has been driven by laws seeking to reduce the effect of refrigerants on the environment and the ozone layer, such as the European F-Gas regulation, whose main objective is the reduction of the use of fluorinated greenhouse gases (GHG) by 70% by 2030. Another example of the effort being made globally in the refrigerant gases reduction is the adoption by almost 200 countries of the Kigali Amendment, the second revision of the Montreal protocol (1987), which represents a concrete plan for progressively eliminate the production and use of hydrofluorocarbons (HFCs), as greenhouse gases considered very harmful to the planet and of a great impact on global warming.

Another relevant point is related to the reduction in energy consumption. HVAC systems, as thermal pumps, have a performance called COP (Coefficient of Performance), the performance (COP) expresses the relationship between the heat units (in thermal kWh) and the power actually consumed by the equipment (in electric kWh). Therefore, the higher the COP, the higher the system performance. As an example, a typical heat pump has a COP of between two and six, depending on the difference between the temperatures of both foci. Therefore, an increase in performance (COP) would generate a reduction in energy consumption and therefore in $CO_2$ consumption.

In the state of the art, there are several documents related to systems for heat transfer for air conditioning.

Thus, for example, in document WO 2016/186572, it is disclosed a machine that takes advantage of ambient heat or residual heat and generates renewable energy with cold energy as a by-product using a carbon dioxide working fluid in a closed loop. The machine is disclosed as an ambient heat engine that comprises an expander for reducing the fluid temperature; a low pressure heat exchanger connected to the expander for ensuring the remaining of the fluid in a fluidized state; a hydraulic motor additionally connected to the low-pressure heat exchanger for converting the hydraulic pressure of the fluid that is powered by at least ambient or low-quality heat and displacement fluid flow; and a high pressure heat exchanger to reheat the fluid by ambient heat to prevent freezing. The expander, the low-pressure heat exchanger, the hydraulic motor, and the high-pressure heat exchanger are connected to each other in a closed loop for circulating the fluid.

The document US 2014/053544 discloses a heat engine system comprising a first heat exchanger, an expander, a second heat exchanger, and a valve assembly. The first heat exchanger is in communication with a heat source for heating a working fluid inside. The expander is downstream of the first heat exchanger and is in communication therein for receiving the thermal working fluid. The second heat exchanger is downstream of the expander and in communication therein for cooling the working fluid received therefrom. The valve assembly is in communication with the second heat exchanger and the expander for providing the selective injection of the expander with chilled working fluid from the second heat exchanger.

The document U.S. Pat. No. 5,099,651A discloses a method for operating gas-powered engine heat pump systems, and type of refrigeration vapor compression. More particularly, it refers to a heat pump system preferably driven by a gas-powered internal combustion engine that is at least partially cooled by a working fluid in fluid connection with the load and an ambient heat source or sump.

None of the state-of-the-art documents disclose the use of a closed system wherein a fluid, and the heat from the ambient or a medium, and only a pressure and decompression step are used for releasing or absorbing heat, in order to produce state changes from liquid to solid or partially solid and vice versa, and liquid to gaseous state and vice versa, and with this generating heat transfer.

Another difference from the state of the art is that the system can be made up of one, two, or more confined circuits, in other words a closed loop without circulation, designed in such a way that the fluid contained in each of these circuits does not circulate, nor does it displace, except for the natural displacement produced by the alternative volume changes produced by the density variation of the fluid exposed to compression and decompression, and also variations caused by the state change of the fluid, whereby the fluid expands and contracts by the same path, which allow the displacement of a piston or similar. On the other hand, in the state of the art for air conditioning systems, it can be seen that the fluid can circulate within it and the fluid is a refrigerant harmful to the environment, while with the present system, a wide variety of fluids can be used for its operation, specifically not environmental harmful liquid refrigerants.

SUMMARY OF THE INVENTION

The proposed solution is based on using ambient heat, a fluid, its compression and decompression, so as to cause the state change of the fluid under pressure within a confined circuit, hereinafter "circuit".

These state changes produce a change in the density of the fluid, alternately causing contractions and expansions, producing a heat transfer, which absorb or release heat. The system also includes a structure that contains basic elements already existing in current HVAC equipment such as fans, in addition to an external heat source that serves as a support for cooling or heating the fluid if necessary.

An advantage of this system is that it can use different types of fluids, such as water, $CO_2$, a phase change material "PCM", among others that do not damage the ozone layer, or greenhouse gases that contribute to global warming, and neither Flammable HFO (hydrofluoroolefins). In general, this system and method do not require environmentally damaging or flammable refrigerants, which contributes to the environmental care.

Another advantage is that the COP (Coefficient of performance) is higher than current technologies, and can reach values well above 10, even more, depending on the load and the fluid, the COP can give in some systems 15, 20, 30, 40 or more, as can be seen in some examples below. This allow a great saving in energy and therefore also a great decrease in CO2 expelled into the atmosphere by lower electricity consumption.

Another advantage is that by using two or more oppositely circuits in the system through a force unit, the amount of energy required to compress the fluid is considerably lowered because the pressures of both circuits are pushing in opposite directions. A counterbalance effect occurs in the plunger of the force unit, so a much lower pressure than the maximum pressure is needed for compressing the fluid in the opposite circuit and producing a state change therein.

Working with state changes from solid to liquid, smaller volumes are often displaced to compress a fluid, unlike traditional systems for the same amount of energy transferred.

The proposed solution is based on using the temperature difference between the fluid and the space around it, in combination with pressure variations, so as to cause the state change of the fluid. As an example, in the case of water, preferably distilled water, hereinafter "water", when subjected to high pressures within a closed loop, it changes from its liquid state to solid or partially solid states such as "Ice II, or Ice III, or Ice V, or Ice VI, or Ice VII" and vice versa, such substance will transform into one or the other depending on the temperature reached and the state of equilibrium to which the system tends, that is, on the heat transfer as a system goes through a process from one state to another. To obtain numerous state changes, the method involves pressure variation on the circuit, in order to take advantage of the changes of state that a fluid experiences at different temperatures in correlation with different pressures.

For example, in the case of water, the system works in a temperature sensitive area that can be seen in the Pressure/Temperature graph shown in FIGS. 6 and 7. In a closed system, such as a cylinder system/piston or similar, and if it is required to increase the temperature of the environment, the temperature of the fluid in its liquid state will be increased, it will be compressed until it will solidify (in the case of ice Ih, it is the reverse), obtaining a solid at a higher temperature than the ambient temperature, so that the system delivers heat to the environment, subsequently the state change from solid to liquid will be occurred, melting and transforming therein into liquid or partially liquid, with which the system expands; and in the case of liquid to solid, solidifying and transforming into solid or partially solid, with which the system contracts or reduces the fluid volume, the piston will travel in both cases a distance "L" caused by a transfer heat rate. If it is required to decrease the temperature of the environment, the fluid in its liquid state will be compressed until it will solidify, releasing heat, subsequently the pressure will be decreased, causing the change from a solid to a liquid state, melting and transforming into a liquid or partially liquid, absorbing heat from the environment, with which the fluid will expand and in the case of liquid to solid, solidifying and transforming into solid, with which the fluid contracts, the piston travels in both cases a distance "L" caused by a heat transfer. In summary, when the fluid temperature and pressure are below the curve (melting/solidification), and the ambient temperature is above or below the water temperature, the state change from solid to liquid will take place. The same is true for the state change from liquid to solid, but the pressure obtained through the compressor or pump or similar and the water temperature must be above the melting/solidification curve.

On the other hand, the present invention consists of a system or device for producing heat transfer between two or more media, allowing domestic, commercial or industrial use, usable for producing heat transfer through the operation of force units, control systems and auxiliary equipment, consisting of one, or two, or more confined circuits designed in such a way that the fluid contained in each of these circuits does not circulate or move, except for the alternative volume changes produced by the density variation of the fluid exposed to the compression and decompression and also variations caused by the state change of the fluid, whereby the fluid expands and contracts along the same path, which allows the displacement of a piston or the like. Typically, the correlation between the pressure and the temperature required within a circuit for obtaining the state change of the water (3) and its variations and correlations is as follows, showing the limit from which the change of state, the missing are found in the references [1] [2] [7] [8] at the end of this specification, for the case of solid to gaseous see reference [9]:

Minimum necessary internal pressure P(II to III) with temperatures between −34.7° C. and −24.3° C. for obtaining a state change from solid ice III to solid ice II.

$$P(III\ to\ II)=213+(1-((T°+273.15)/238)^{\wedge}19.676-1).$$

Minimum necessary internal pressure P(Ih) with temperatures between −21.98° C. and 0° C. for obtaining a state change from solid or partially solid to liquid:

$$P(Ih)=-395.2*((T°+273.15)/273.16)^{\wedge}9-1).$$

Minimum necessary internal pressure P(III) with temperatures between −21.98° C. and −16.98° C. for obtaining a state change from liquid to solid.

$$P(III)=208,566-0.299948\times208,566\times(1-((T°+273.15)/251,165)^{\wedge}60).$$

Minimum necessary internal pressure P(V) with temperatures between −16.98° C. and 0.16° C. for obtaining a state change from liquid to solid or partially solid:

$$P(V)=350.1-1.18721\times350.1\times(1-((T°+273.15)/256.16)^{\wedge}8).$$

Minimum necessary internal pressure P(VI) with temperatures between 0.16° C. and 81.85° C. for obtaining a change from liquid to solid or partially solid state:

$$P(VI)=632.4-1.07476\times632.4\times(1-((T°+273.15)/273.31)^{\wedge}4.6).$$

Minimum necessary internal pressure P(VII) with temperatures between 81.85° C. and 90° C. for obtaining a change from liquid to solid or partially solid state:

$Ln(P(VII)/2216)=1.73683\times(1-((T°+273.15)/355)^{-1})-0.0544606\times(1-((T°+273.15)/355)^5)+0.806106\times10^{-7}\times(1-((T°+273.15)/355)^{22})$.

Maximum necessary internal pressure P(II to III) with temperatures between −34.7° C. and −24.3° C. for obtaining a state change from solid ice II to solid ice III.

$P(II \text{ to } III)=213+(1-((T°+273.15)/238)^{19.676}-1)$.

Maximum necessary internal pressure P(Ih) required with temperatures between −21.98° C. and 0° C. for obtaining a state change from liquid to solid or partially solid:

$P(Ih)=-395.2*((T°+273.15)/273.16)^9-1)$.

Maximum necessary internal pressure P(III) with temperatures between −21.98° C. and −16.98° C. for obtaining a state change from solid to liquid:

$P(III)=208,566-0.299948\times208,566\times(1-((T°+273.15)/251.165)^{60})$.

Maximum necessary internal pressure P(V) with temperatures between −16.9° C. and 0.16° C. for obtaining a state change from solid or partially solid to liquid:

$P(V)=350.1-1.18721\times350.1\times(1-((T°+273.15)/256.16)^8)$.

Maximum necessary internal pressure P(VI) with temperatures between 0.16° C. and 81.85° C. for obtaining a change from solid or partially solid to liquid state:

$P(VI)=632.4-1.07476\times632.4\times(1-((T°+273.15)/273.31)^{4.6})$.

Maximum necessary internal pressure P(VII) with temperatures between 81.85° C. and 90° C. for obtaining a change from solid or partially solid to liquid state:

$Ln(P(VII)/2216)=1.73683\times(1-((T°+273.15)/355)^{-1})-0.0544606\times(1-((T°+273.15)/355)^5)+0.806106\times10^{-7}\times(1-((T°+273.15)/355)^{22})$.

The temperatures (T°) are in degrees Celsius (° C.) and the pressures in Megapascals (Mpa). By rendering these equations into a pressure vs. pressure graph temperature, the melting or solidification curve can be seen. The upper limit of the curves represents the solid or partially solid state of water (3) and the lower limit, its liquid state.

Therefore, the internal pressure has to vary between a higher pressure than such determined by the curve and a lower pressure of the same, which causes a thermal process of heat transfer, which produces the changes of state. The system allows to obtain state changes from solid or partially solid to liquid and vice versa, its gaseous state to its liquid or supercritical fluid state and vice versa, its gaseous state to its solid or partially solid state and vice versa, from its liquid or supercritical fluid state a solid or partially solid and vice versa, between the solid states of a fluid, as well as between the solid states of water known as ice VII or ice VIII to ice VI and vice versa, ice Ih to ice III and vice versa, ice VI to ice V and vice versa, ice II to ice III and vice versa, ice II to ice Ih and vice versa, allowing also to obtain state changes passing from ice II, or ice III, or ice V, or ice VI to liquid and subsequently from liquid to ice Ih and vice versa.

In all cases, the state changes can be partial, so the system allows obtaining state changes from solid or partially solid to liquid or partially liquid and vice versa, gaseous or partially gaseous and liquid or partially liquid and vice versa, supercritical fluid to solid or partially solid and vice versa, supercritical fluid to superheated steam and vice versa, better seen in FIG. 6. Being the same with other changes of state.

As an example, if the water is in the circuit, in a liquid state, at a temperature of 24° C., and a pressure of 700 Mpa, it is required to increase the pressure to over 951 Mpa for producing the state change from liquid to solid or partially solid, always considering the same internal temperature. On the contrary, if the water is in a solid or partially solid state, at 24° C., with an internal pressure of 1000 Mpa, it is required to decrease this pressure to 950 Mpa, which may decrease even further for producing the state change and change to liquid state.

If desired, obtaining the necessary pressure to change the state of a fluid, the pressure can be achieved by drawing a curve on a PT diagram where the slope of the curve that separates two states can be obtained with the Clausius-Clapeyron equation [10] [11], an equation that takes into account the latent heat or enthalpy of phase change, the volume variation and the temperature to obtain the slope, a curve known as a coexistence curve that in the case of passing from a solid state to a liquid state or vice versa is the melting-solidification curve.

$dP/dT=\Delta H/T\Delta V$ where dP/dT is the slope of this curve, ΔH is the latent heat or enthalpy of the phase change and ΔV is the volume.

The pressure difference necessary for the state change can also be obtained with this equation, providing the latent heat, temperature, temperature variation and volume variation.

BRIEF DESCRIPTION OF THE FIGURES

The accompanying figures are intended to provide a better understanding of the invention, and they are part of this specification.

DETAILED DESCRIPTION OF THE INVENTION

The present invention consists of a method for producing heat transfer between two or more media and a system for executing said method, usable for air conditioning a space or any use that requires heat transfer between two or more media, and may be capable of being used for domestic, commercial or industrial use.

The basis of this invention is using ambient heat in combination with pressure variations, so that by causing the state change of the inserted fluid within a confined circuit which does not circulate or displace, with the exception of alternative changes in volume caused by the state change of the fluid, so that this fluid expands and contracts along the same path, a heat transfer occurs.

Referring to FIGS. 1 to 5, the present invention operates on the basis of heat exchange from the ambient or from a medium to the chamber (5) and the pipes (8) of a cylinder (1) piston (2) system or the like.

Figure 1:
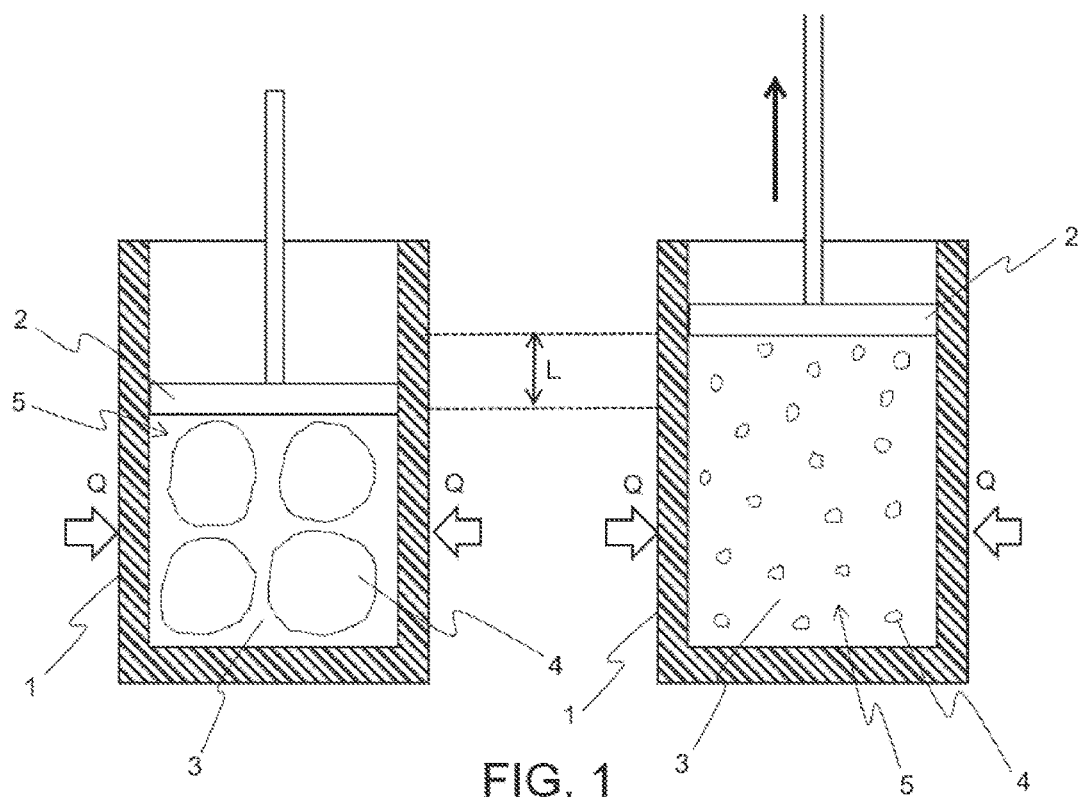
FIG. 1 shows a schematic view of the cylinder/piston system, wherein the ambient or medium temperature is at a higher temperature than the fluid temperature within the circuit and the system expansion can be appreciated, as it absorbs heat "Q" from the ambient or the medium.
Figure 2:
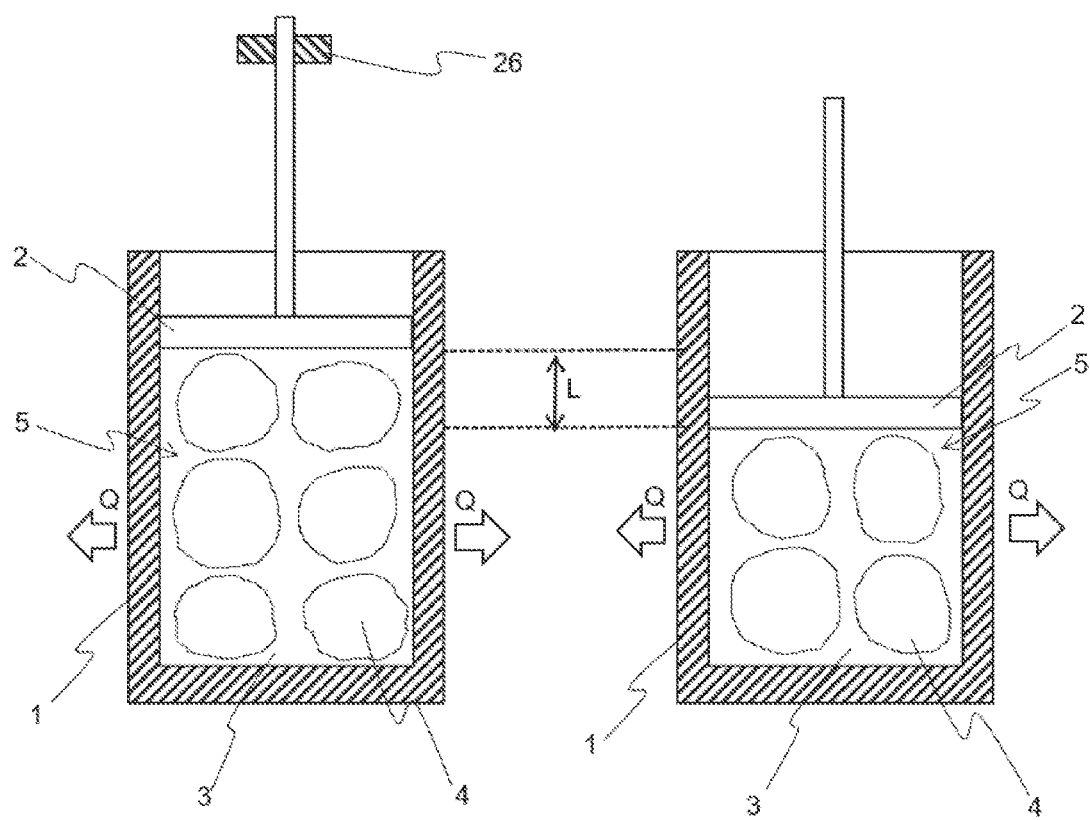
FIG. 2 shows a schematic view of the cylinder/piston system of FIG. 1, wherein the piston has been connected to a servobrake or an electronically driven one-way valve or other equipment that performs a similar function for stopping its stroke.
Figure 3:
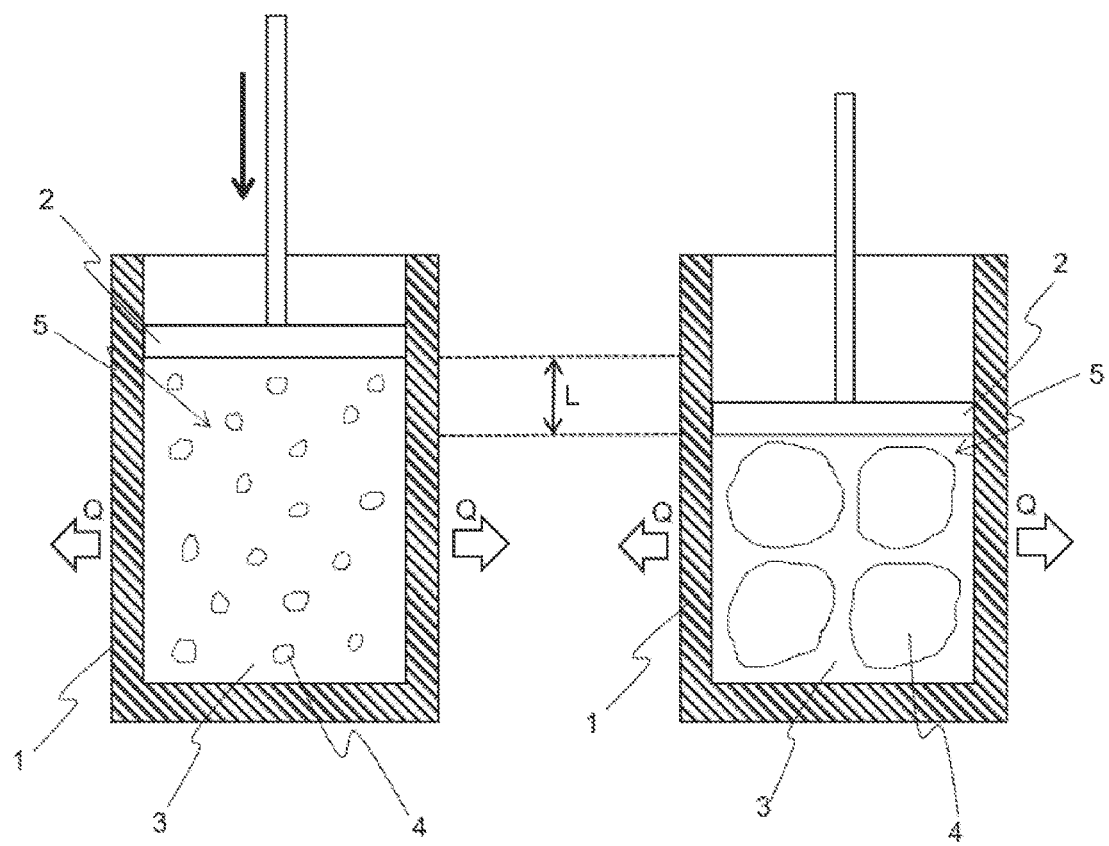
FIG. 3 shows a schematic view of the cylinder/piston system, wherein the piston is compressing and the ambient or medium temperature is at a higher temperature than the fluid temperature within the circuit, which transfers heat "Q" to the ambient or medium, in the case that the system is changing from liquid to solid, causing the generation of the solid.
Figure 4:
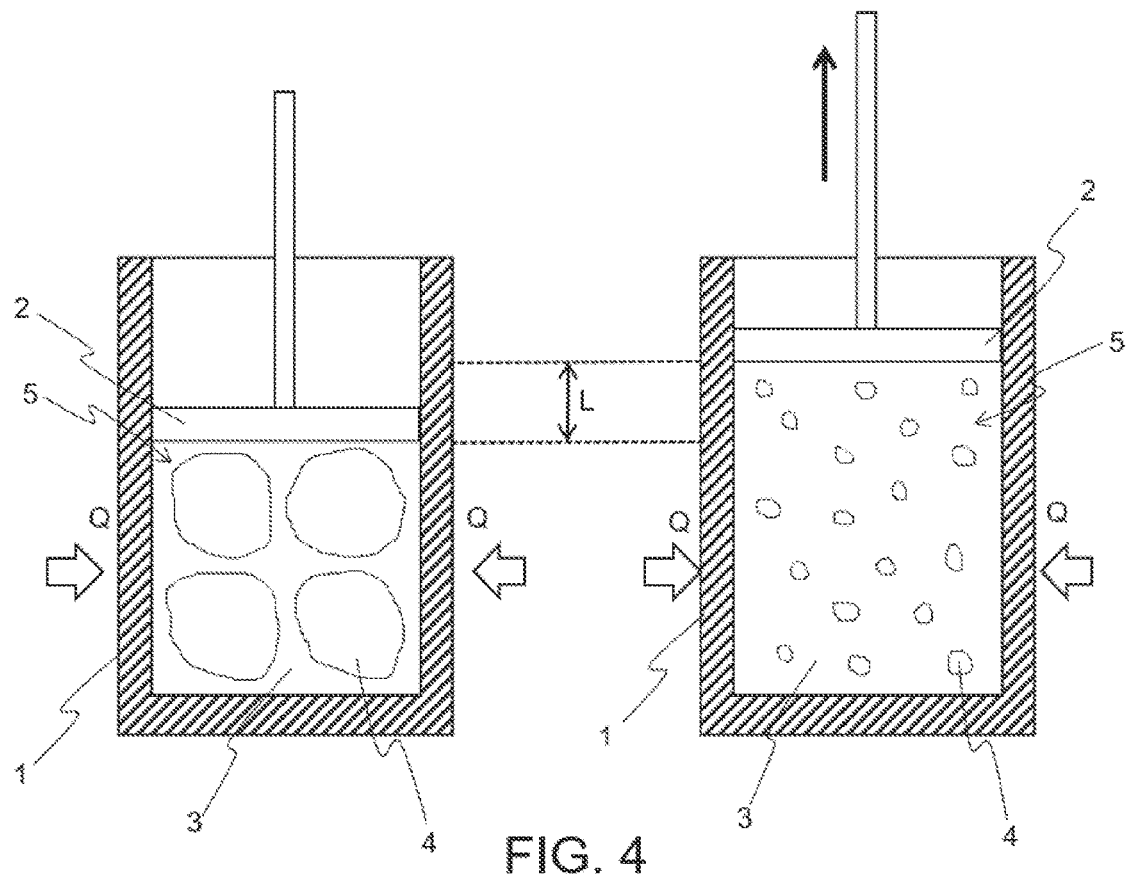
FIG. 4 shows a schematic view of the cylinder/piston system, wherein the piston is released, and in the event that the ambient temperature is at a higher temperature than the fluid temperature within the circuit, it absorbs heat "Q" from the ambient or a medium, since the fluid is being changed from solid to liquid.
Figure 5:
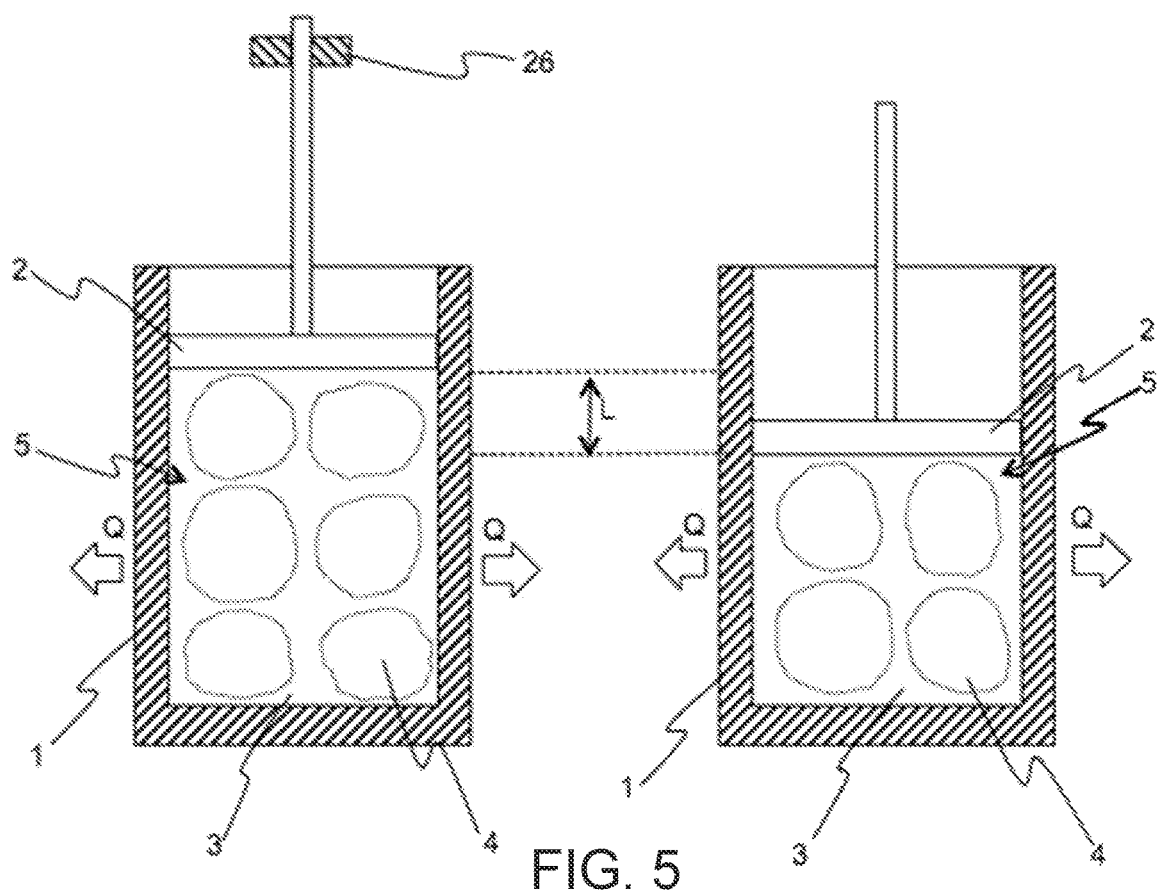
FIG. 5 shows a schematic view of the cylinder/piston system of FIG. 4, wherein the piston has been connected to a servobrake or an electronically driven one-way valve for stopping its stroke, and thus starting a new cycle with the support of other components of the force unit.
Figure 6:
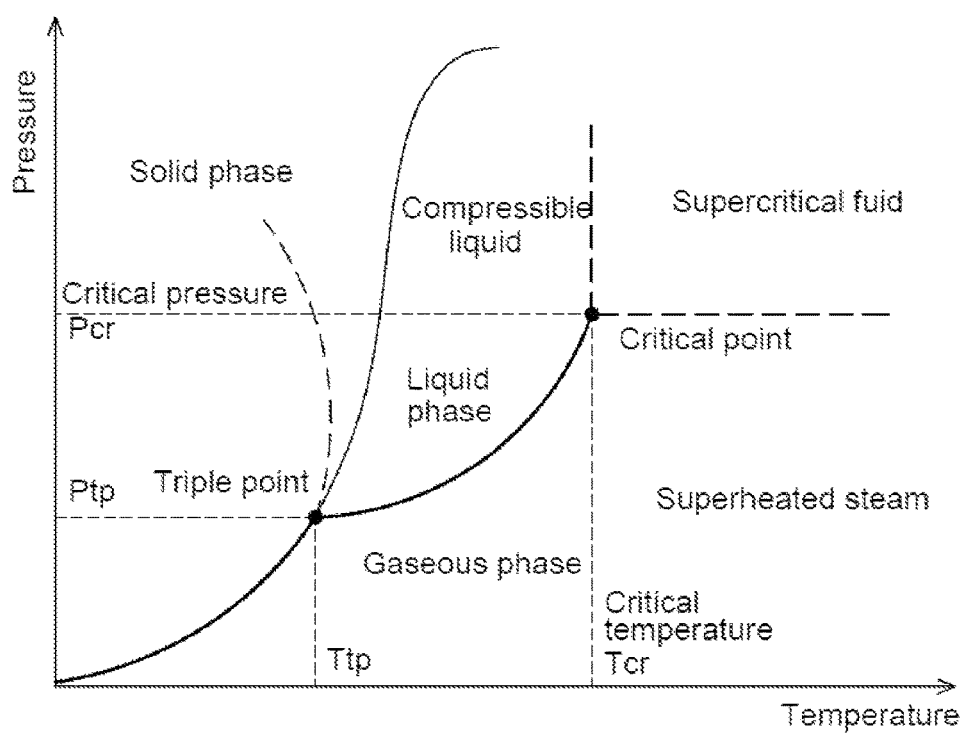
FIG. 6 shows an enlarged Pressure/Temperature graph of the water in the sensitive zone, wherein the system moves in the ice zone Ih, II, III, V and VI. This figure explains the phase changes, from its gaseous state to its liquid or supercritical fluid state and vice versa, from its liquid or supercritical fluid state to solid or partially solid and vice versa, as well as between the solid states of water known as ice VII or ice VIII to ice VI and vice versa, ice Ih to ice III and vice versa, ice VI to ice V and vice versa, ice II to ice III and vice versa, ice II to ice Ih and vice versa.
Figure 7:
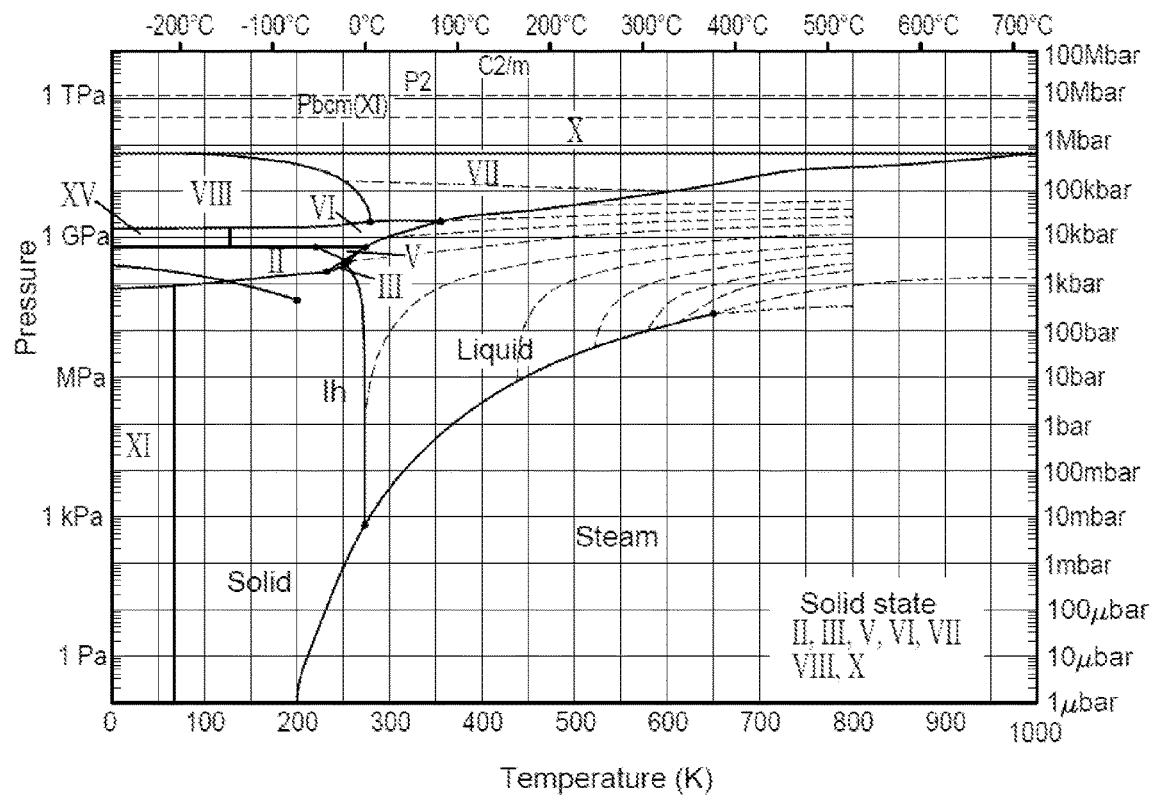
FIG. 7 shows a Pressure/Temperature graph of the water in the sensitive zone, wherein the system moves in the ice zone Ih, II, III, V, VI and VII, wherein the different densities of the water at different pressures can be appreciated, which means that it has a volume change, so the water is compressible.
Figure 8:
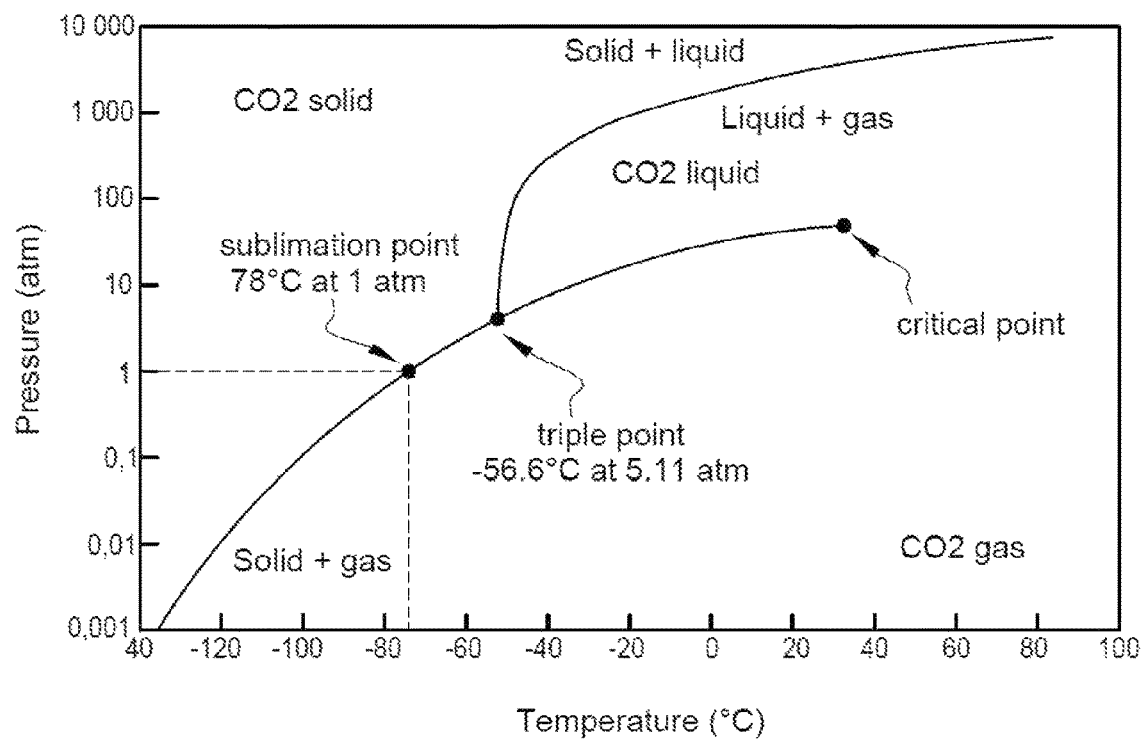
FIG. 8 shows a Pressure/Temperature graph of carbon dioxide $CO_2$.
Figure 9:
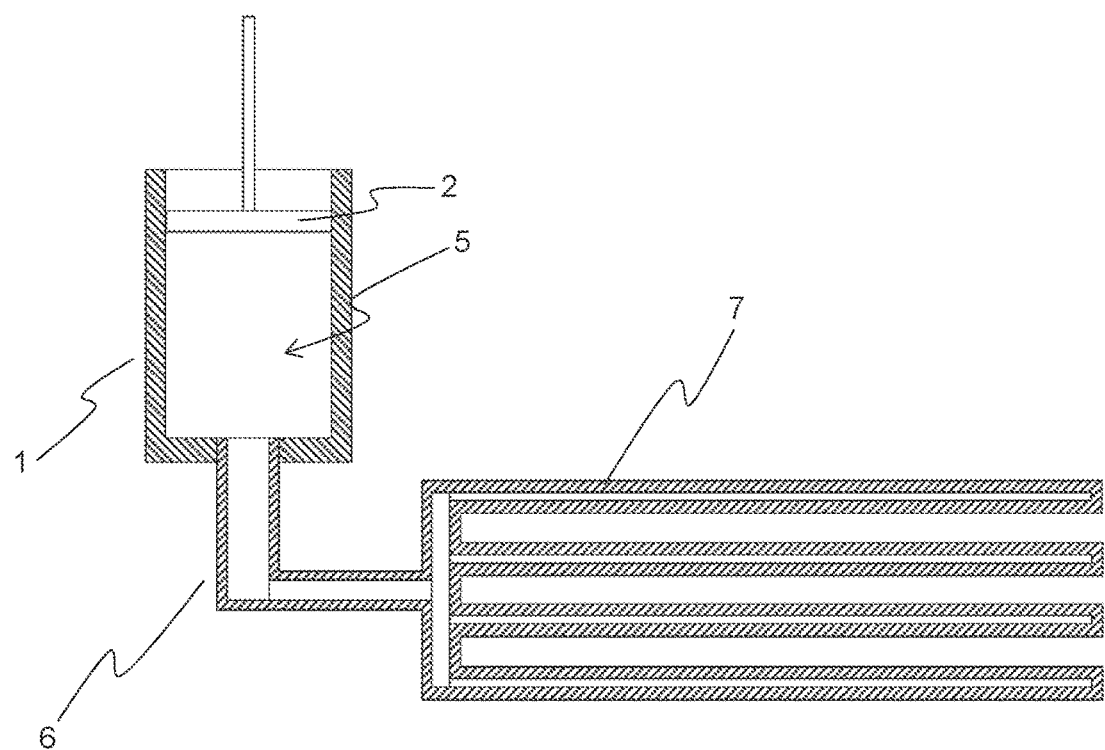
FIG. 9 shows a schematic view of the cylinder/piston system with circuit wherein the chamber is connected to a circuit by pipelines formed by a plurality of pipes; plates, fins, which may be capillary.
Figure 15:
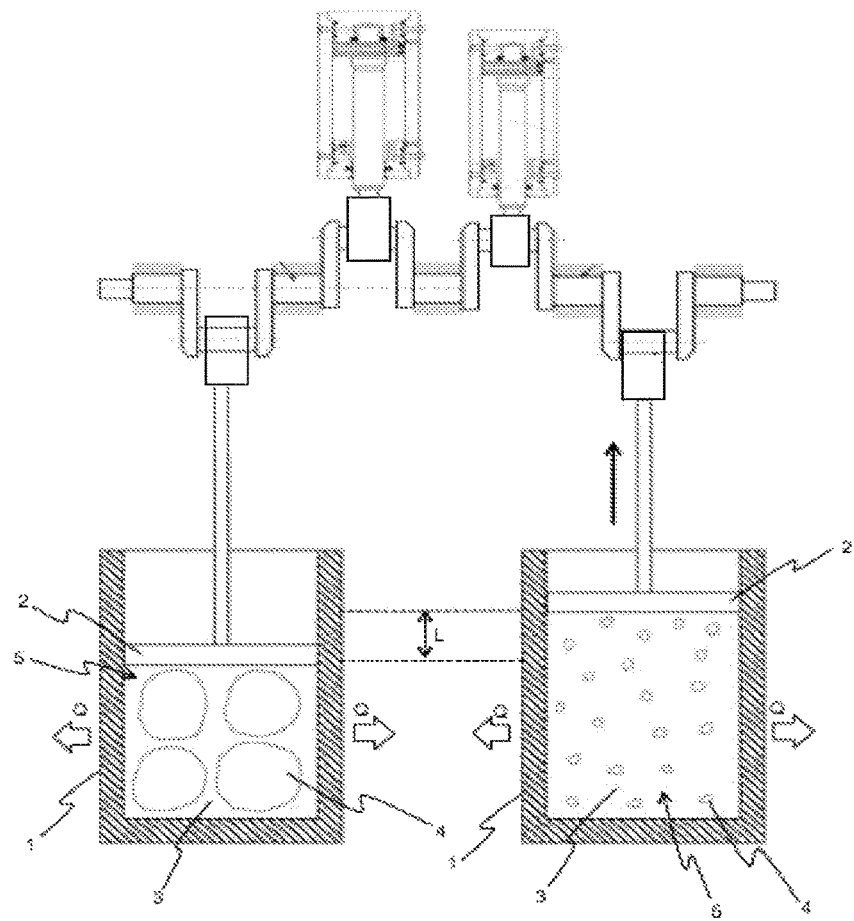
FIG. 15 shows a schematic view of two cylinder/piston systems connected through a force unit.

In FIG. 1, the chamber (5) together with the fluid inserted into the pipes (8) of the heat exchanger or the like have reached a pressure, for example, higher than 300 MPa according to what is shown in the graphs of FIGS. 6 and 7, in the case of using the system as changes from solid to liquid state and vice versa being generated within said chamber (5) and solid pipes (8). In the event that the ambient or exterior medium temperature is higher than the temperature of the chamber (5) and pipes (8), a heat exchange occurs, wherein the chamber (5) and the pipes (8) absorb heat from the medium that surrounds the circuits when said fluid melts. With this, in the chamber (5) and the pipes (8), an expansion occurs since the solid turns into a liquid and small portions of solid, thus moving the piston (2) in a distance "L", caused by a heat transfer, taking advantage of it for heating an ambient or medium. As shown in FIG. 2, in FIG. 15, in FIG. 16, in FIG. 17 and in FIG. 19 once the distance "L" has been traveled, piston 2 is connected to an unidirectional electronically driven servobrake (26), or one-way electronically driven valve, or other device that performs a similar function, such as a PLC or control system that stops it. The chamber (5) and the pipes (8) absorb heat when the solid melts, solidifying with the increase in pressure when it passes the melting/solidifying curve, releasing heat. When the chamber (5) and the pipes (8) have abundant solid and if the temperature on the exterior is still higher than that of the chamber (5) and the pipes (8), pressure is released in the case of using a the servobrake or the like, it is released and said chamber and pipes absorb heat from the ambient or external medium, melting the solid as shown in FIG. 4. When the solid becomes a liquid with small portions of solid, the piston (2) moves outward for a distance "L", causing a state change producing heat transfer. At this point the piston or the like is braked again, for this a servobrake or the like can be used, and an increase in pressure is caused through the force unit (10), in the chamber (5) and pipes (8), as shown in FIG. 17, FIG. 19, FIG. 20 and FIG. 21, thus generating a duty cycle.

Since the power unit (10) can be connected both by releasing or absorbing heat through the system, it can work at all times, especially if there is a parallel system that works in reverse. That is to say, heat can be released and cause the state change or heat can be absorbed and cause the change of state.

As mentioned above, the present invention describes a method for producing heat transfer between two or more media, and it can be used for domestic, commercial or industrial use, subject only to the existence of a temperature difference and pressure variations, wherein said method comprises the following steps:

(a) compressing a fluid inserted in the pipe (8) until generating a change of state;

(b) decompressing the fluid for generating again a state change in order to reach the initial state.

Wherein the compression and decompression of the fluid also includes:

(a) moving a piston or plunger, wherein the piston having to reach a minimum stroke in order to achieve the desired pressure;

(b) exposing said closed circuit to the ambient or medium until generating a state change in said fluid inserted into the pipe (8) and a heat transfer;

(c) wherein the state change corresponds to passing from its liquid or supercritical fluid state, to solid, gaseous to liquid or supercritical fluid, (d) decompressing the fluid inserted into the pipe (8) and exposing said closed circuit to the ambient or medium, causing the expansion of the fluid inserted in the pipe (8), until generating a state change again and causing a transfer of heat resulting from the state change of the fluid inserted into the pipe (8), wherein said heat transfer occurs in the heat exchanger or the like;

(e) wherein the state change corresponds to transforming said fluid inserted into the pipe (8) from its solid state to liquid, or supercritical fluid, liquid or supercritical fluid to gaseous.

On the other hand, the method can also consider the steps:

(e) braking with a one-way electronically driven servobrake, or one-way electronically driven valve, or the like, or directly through the force unit, the piston for increasing the pressure supported with the force unit, in the case of using two or more circuits the force unit is used to support the return of the opposite circuit when the circuit is expanding;

(f) releasing the unidirectional electronically driven servobrake or valve, or other device that performs a similar function, or directly through the force unit for releasing the piston, when two or more circuits are used and a linear intensifier pump is used for producing the balance effect, it will fulfill the function; and (g) exposing said closed circuit to the ambient or medium, which has a lower or higher temperature, for causing the contraction of the fluid and returning the piston to an initial position and causing a heat transfer due to the state change of the fluid for beginning a new cycle.

The described method also includes using the temperature in combination with pressure variations that can be caused by different force units, so as to cause the state change of the fluid subjected to pressures within a confined circuit, from its liquid or partially liquid state, or supercritical fluid to a solid or partially solid state and vice versa, gaseous to liquid and vice versa, substance that will transform into one or the other depending on the fluid temperature, depending on the pressure it is subjected to, due to the heat transfer, as a system goes through a process from one state to another, this is due to the tendency of the fluid for equalizing the temperature of the medium that surrounds the circuit.

The operation of the process depends on a system consisting of a set of equipment necessary for the production of the compression and decompression within the circuit, and it can be obtained through pumping equipment, hydraulic pumps, or the like, a set of equipment called a force unit (10), as shown in FIG. 17, FIG. 19, FIG. 20 and FIG. 21.

In general, the system consists of a chamber (5) that is part of a cylinder (1) and the piston (2), wherein the fluid by pressure increases its volume for absorbing heat or decreases its volume for releasing heat.

Figure 17:
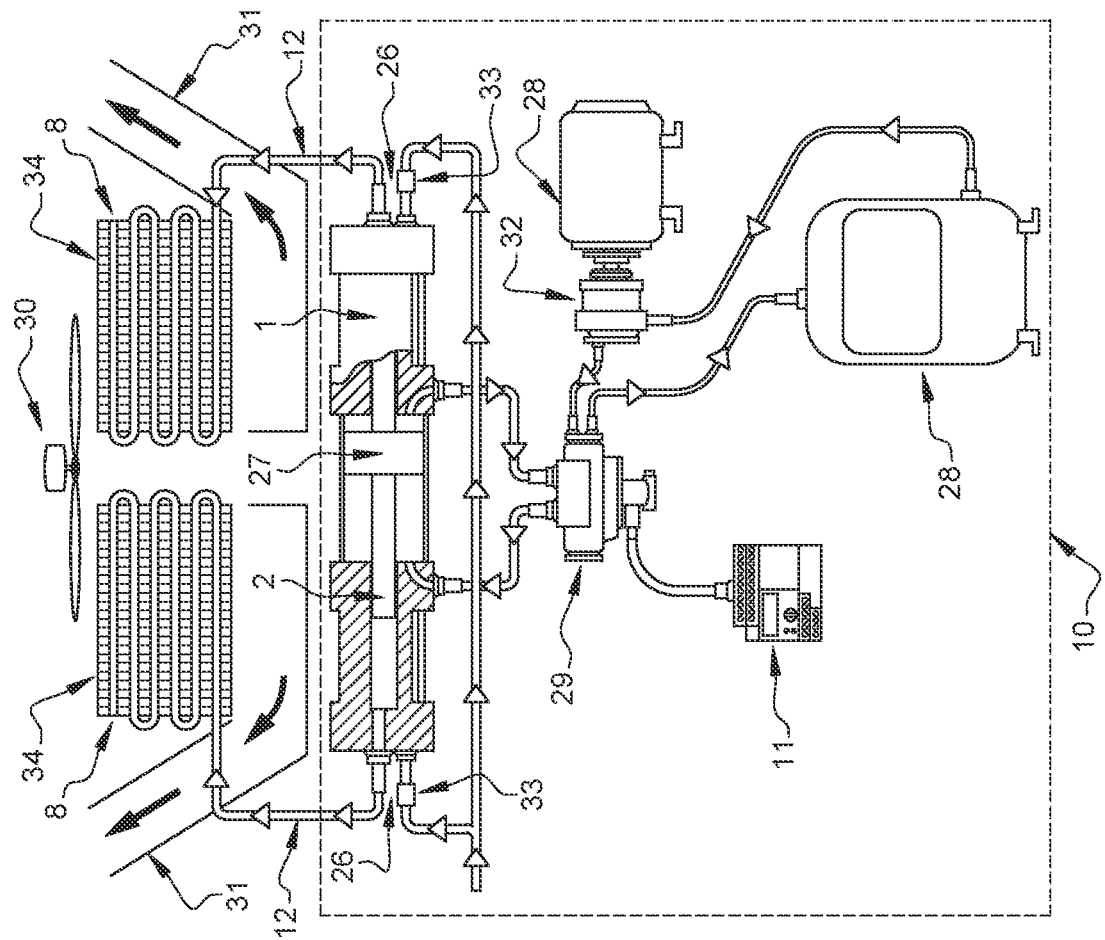
FIG. 17 shows a schematic view of a cylinder/piston system inserted into the linear intensifier pump type force unit or the like together with two circuits and their respective control systems.
Figure 18:
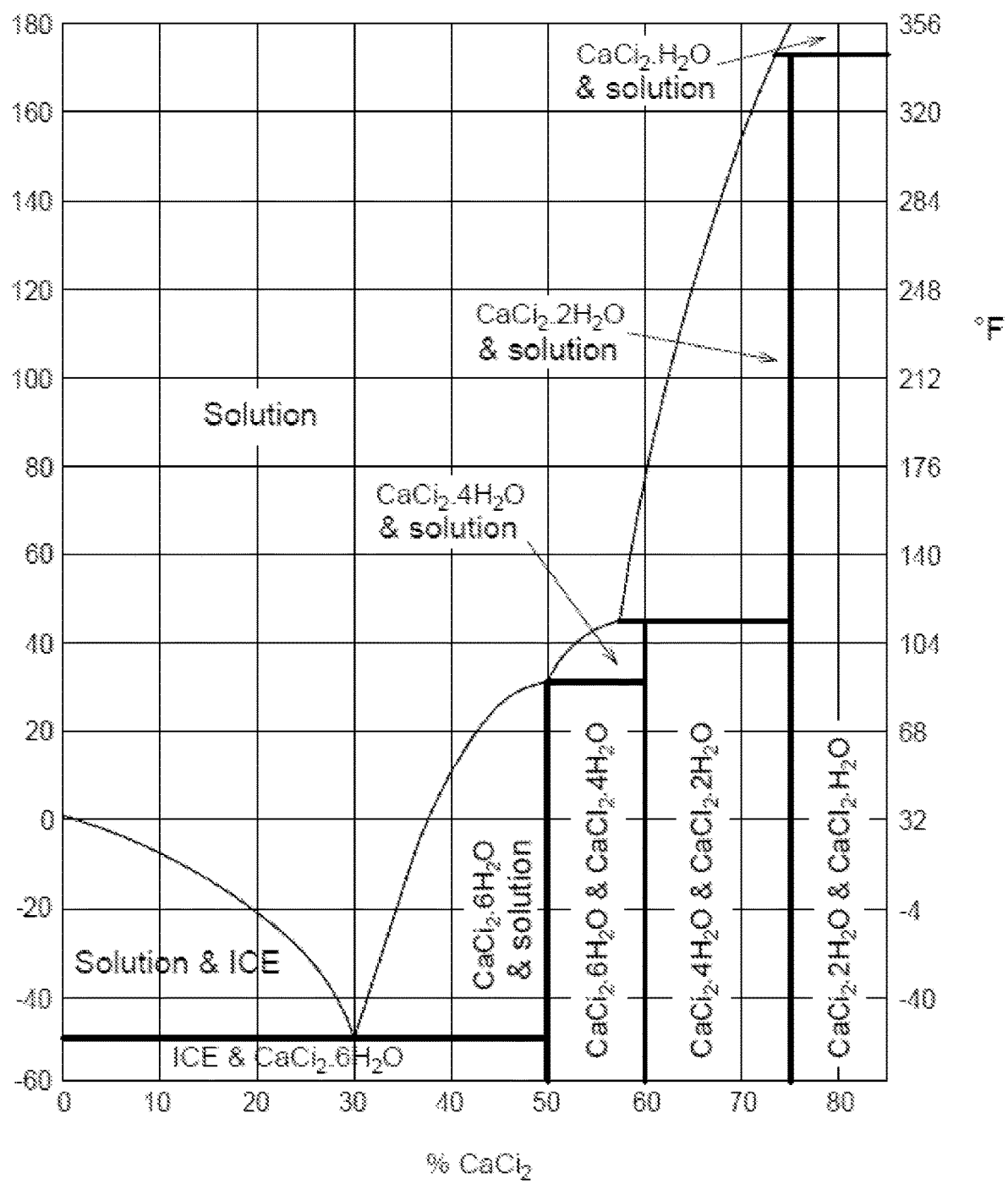
FIG. 18 shows a Temperature/Percentage graph of phase change of calcium chloride ($CaCl_2$)) of a mixture of water with calcium chloride.

In particular, a configuration of the system can be seen in FIG. 17, consisting of a circuit of pipes, the main pipes (12) are connected to a cylinder (1) with a plunger (27) and piston (2), for moving the piston and for increasing or decreasing the internal pressure of the circuit, a hydraulic system, a pressurizing pump, a hydraulic pump (32), a linear intensifier pump (1), a direct-drive rotary pump or a plunger pump (1) or another equipment that can fulfill this function. In the case of FIG. 17, the hydraulic pump (32) together with the motor (28), in this case electric of the respective force unit, it will exert the necessary force on the respective piston (27) for increasing again the pressure of the circuits. Subsequently, the main pipes (12) are connected to a plurality of pipes or pipes with plates, fins or the like (8), these capillaries or the like being able to be arranged, in order to increase the heat transfer surface and form a heat exchanger (3, 4). Fans (30) push or suck the air passing through the heat exchanger (34), so that the pipes (8) are in contact with the ambient or medium. The cold or hot air flow is expelled or introduced through the ventilation duct (31).

In the case of using a linear intensifier pump (1), it has a sensor that allows the inflow of filling fluid to be controlled, and if necessary, through a filling valve (33) and for controlling the pressure at through a relief valve, and in this case, a hydraulic pump (32) together with a directional control valve (29) and other typical elements for operating a linear intensifier pump (1).

The action of the electronically driven one-way valves or the like applied to the piston or the like, prevents it from returning, and leaves it at its minimum point of travel with the support of other components of the force unit (10), such as a hydraulic pump, linear intensifier pump, plunger pump, or any type of pressurizing pump that fulfills the function of increasing the fluid pressure within a circuit, producing a state change during contraction (the pressure exerted on a piston or the like, it can cause suction or less than atmospheric pressure depending on which side of the piston is pushed).

The force unit will be connected and controlled by the control system (11).

Figure 19:
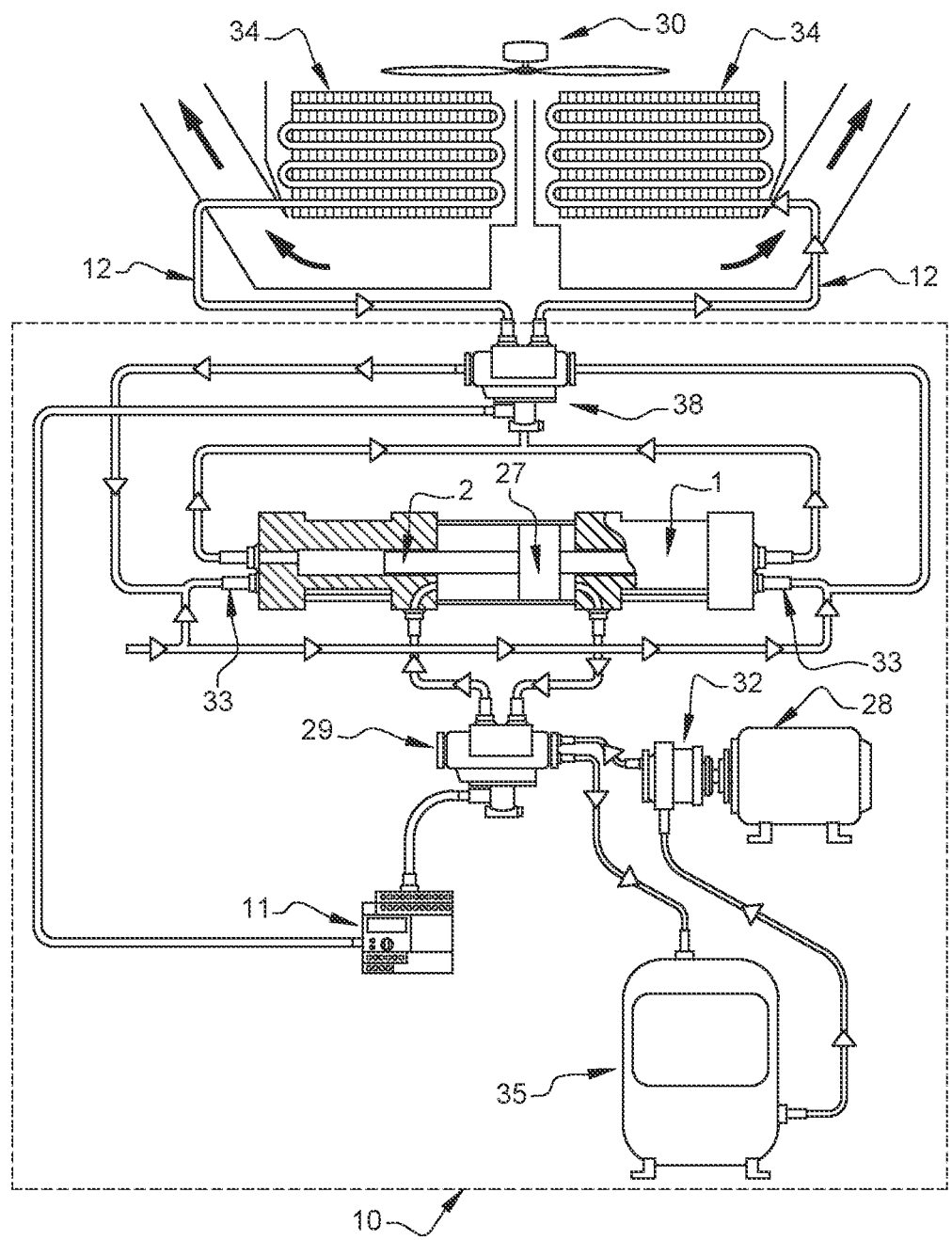
FIG. 19 shows a schematic view of an intensifying linear pump type force unit or the like together with two circuits and their respective control systems.
Figure 20:
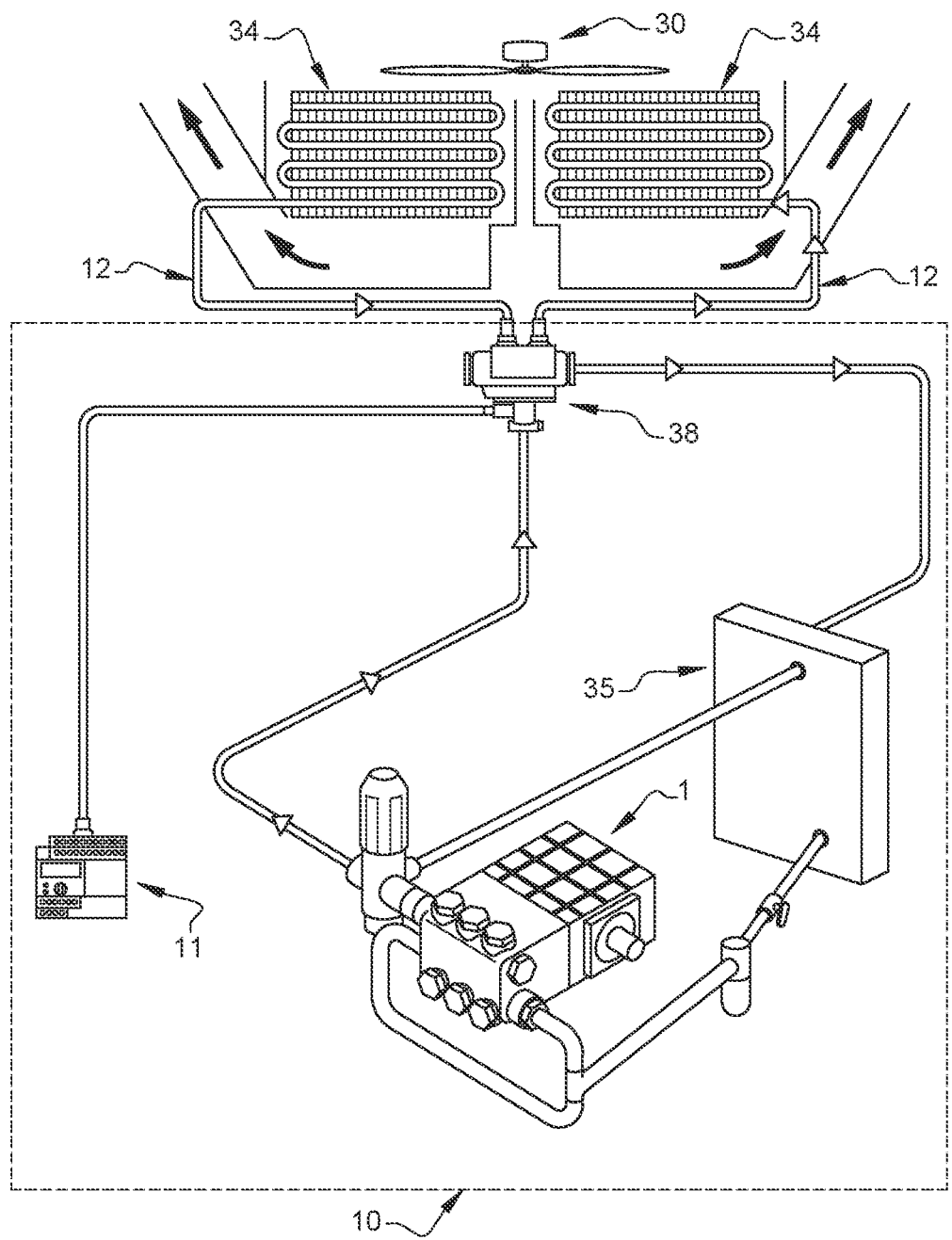
FIG. 20 shows a schematic view of a plunger pump type force unit or the like together with two circuits and their respective control systems.

FIG. 19 shows a variation with respect to the configuration of FIG. 17, this figure shows a system that could work with a fluid such as water, in this case, the state change from liquid to solid state (ice Ih, or ice II, or ice III, or ice V, or ice VI, or ice VII as the case may be), the force unit equipment that would be closest to the pipes (8) would be a directional control valve or the like (38), in the case that this is not present and it is used a linear intensifying pump or double-acting piston or the similar, it would be the latter. One or more force units connected to the main pipes (12), which closes the set of main pipes (12) and pipes (8) and generates internal pressure, due to the electronically driven unidirectional servobrake (26), or one-way valve, or the like prevents water from dilating when it is in a partially liquid phase, since the water will push the piston without being able to displace it, causing a pressure increase that goes beyond the melting/solidification curve (FIGS. 6 and 7) and it starts its solidification process. When starting this process, the water decreases its volume due to partial solidification, which causes a piston displacement with the support of the force unit (10) and a decrease in pressure, which in turn causes the water to be again under the curve and repeat the process successively until the water is completely or almost completely compressed in the solid state, always with the support of the pump that exerts pressure on the fluid that is within the circuits or the like.

Figure 21:
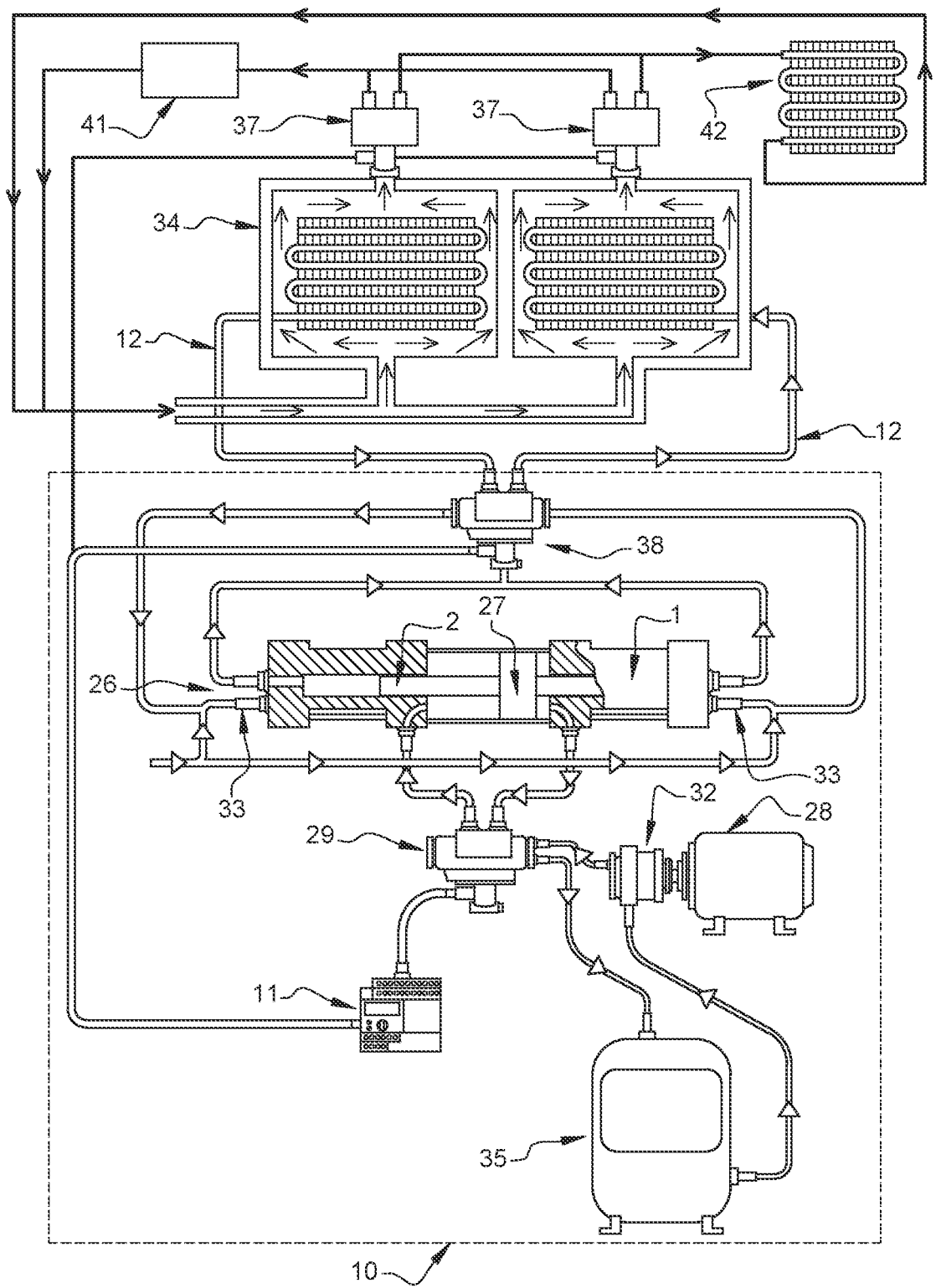
FIG. 21 shows a schematic view of a force unit together with two circuits through wherein a liquid passes through the heat exchangers and is directed by a control valve to the place to be used, or an external heat exchanger or the like complying the goal of releasing or absorbing heat, and their respective control systems.

On the other hand, FIG. 21 shows a configuration of the system for transferring heat to a fluid (water), in this case, the fluid passes through the pipes (34) next to the heat exchanger (34), the directional control valves (37) control the cooled and heated fluid, which can be water that comes out of the heat exchangers (34). For cooling or heating the fluid that comes out of the heat exchangers, it can go through a cooling tower or heat exchanger (42) or the like or a deposit for use (41) and then return it to the system.

The system is conceptualized for operating using any fluid, be it gas or liquid, being able to be in a gaseous state, liquid or supercritical fluid and solid or partially solid, whose vaporization or condensation, fusion or solidification curves are below 2465 Mpa. This means that pressures lesser than atmospheric pressure, that is negative pressure and between temperatures of −60° C. and 140° C., are also considered. It can also work in the case of a state change between the solid states of a fluid that produces changes of state between solids.

These state changes produce a change in the fluid density, alternately causing contractions and expansions, obtaining as a result the heat transfer.

The presented method is suitable for absorbing or releasing ambient heat, allowing domestic, commercial or industrial use, and it can be built or installed in any geographical location, whether outdoors or inside buildings, where access to a minimal difference in temperature with respect to the fluid is available, provided that the fluid parameters that will be introduced into one, or two, or more confined circuits, without circulating or moving fluid, except for the alternative changes in volume caused by the state change of the fluid, so that this fluid expands and contracts along the same path (FIG. 1 to FIG. 5), they do not drop below a certain pressure, while the maximum temperature of the fluid will be conditioned by the maximum pressure of design, not exceeding predetermined minimum and maximum limits.

For an embodiment of the invention and its respective system, which contemplates the use of a fluid, can be water, preferably distilled water, the proposed method operating in the following manner:

water is introduced into one or more sealed chambers (5), subjecting it to a high pressure, in the case of transforming into a solid known as ice II, typically greater than 212 MPa, and it is exposed to ambient temperature, which typically must be equal to or greater at −50° C. (in the case of refrigeration), −24° C. in the case of transforming from ice III to liquid and vice versa, while the maximum temperature within the system will be conditioned by the maximum design pressure, which for the purposes of its industrial application, the pressure must not exceed 2465 Mpa, at a temperature not exceeding +90° C. (In this case, it is also possible to work with temperatures below 0° C. and above −24° C. with temperatures and pressures that can be seen in FIG. 7). And the minimum pressure within the system for this case will typically be greater than 0.13 Mpa for the case of transforming solid to liquid and vice versa.

Then, by means of force units, the pressure is controlled so as to cause the state change of the water, from the liquid state to the solid state known as Ice Ih, Ice II, or Ice III, or Ice V, or Ice VI, or Ice VII and vice versa. These state changes occur as a result of the increase or decrease in pressure along with the transfer of heat between the space to be cooled or heated and the fluid within the circuit. The correlation between the different pressures required as a function of different temperatures for this circuit for operating is explained in the detailed description below.

The chamber (5); the main pipe (12) and the pipes (8) or the like, forming a heat exchanger (34) or the like, are transformed into a closed circuit and are composed of "n" number of pipes or circuits inscribed in a block or the like, "n" may be greater than or equal to 1, which can take complex forms as an example, spiral, zigzag, describing undulations, and of variable length, the greater the amount of energy to be transferred by each circuit, the longer this is and on the contrary, if less energy is desired; the circuit can be shorter.

The walls of the circuit are composed of a material that has resistance and thermal conductivity, such as carbon nanotubes, graphene nanotubes, carbon, graphene, iron, steel, titanium, copper, among other materials, with necessary wall thicknesses (6) and (7) to withstand the maximum design pressures of the system, exposing the circuit to ambient temperature, water temperature that must be equal to or greater than −50° C., and pressurizing it in the case of transforming to a solid known as ice II, typically higher 212 Mpa, the minimum pressure within the system will typically be greater than 0.13 Mpa and in the case of causing the state change of the water from liquid to gaseous and vice versa, or from solid to gaseous and vice versa the temperatures may be between −50° C. and 90° C. with pressures between 1 Pascale and 0.13 Mpa, for all cases, all by pressurizing it, through one or more force units (10), installed at one circuit end, and in the case that a linear intensifier pump is used (FIG. 17) or the like, the piston will be within this force unit. The force unit (10) is composed of: an apparatus that can increase or decrease the internal pressure of the circuit, be it a piston, plunger (27), hydraulic cylinder piston, a pressurizing pump, hydraulic pump (32), linear intensifying pump (1), direct drive rotary pump or plunger pump (1) (FIG. 17, 20) or the like; electric motor or diesel, or the like (28); directional control valve for causing the displacement of the plunger (27) or other; directional control valve (38) for directing the pressure to a circuit or another circuit alternately together with controlling the return of the fluid that is decompressing, directional control valve (37) controlling the cooled and heated fluid, which may be water that comes out of the heat exchangers (34); cooling tower or heat exchanger (42) or the like for cooling or heating the fluid that comes out of the heat exchangers (FIG. 21); hydraulics pump for displacing the fluid that passes through the heat exchangers (34) (FIG. 21); in addition to other components such as actuators and electronically driven servobrakes, filling valve (33), relief valve or the like, hydraulic fluid tank (35), each of the units connected to the control system (11). This system controls the pressure and contraction in such a way as to cause the state change of the water, from the liquid state to the solid or partially solid state (Ice Ih, Ice III, or Ice V, or Ice VI, or Ice VII), as the case may be at different temperatures; likewise, if the pressure is controlled in such a way as to obtain the water expansion, it will undergo the state change in the opposite direction. These state changes produce a change in the density of the water (3), alternatively causing its contraction with the help of a force unit and expansion that moves a piston (2), producing a heat transfer, thus absorbing and releasing heat. In addition, the control system controls the auxiliary equipment (9).

Figure 10:
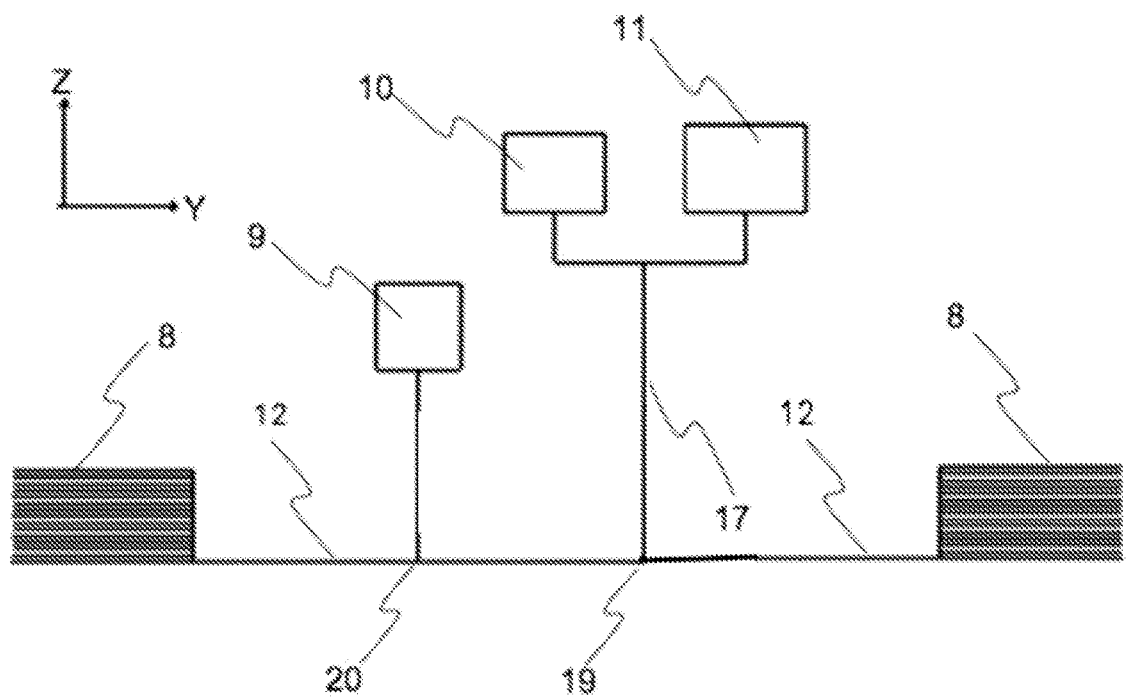
FIG. 10 shows a schematic front elevation view of an embodiment of a system for extracting or transferring heat from the ambient or a medium, according to the present invention.

The method is based on certain values and their correlations for causing the state changes of the fluid, in this case water (3), considering different pressures that are required depending on its internal temperature, both measured with one or more sensors, and that they are controlled through a control system which controls the operation of the force units (FIG. 16, 17, 19, 20, 21) and the auxiliary equipment (9) (FIG. 10, 11, 12).

Figure 22:
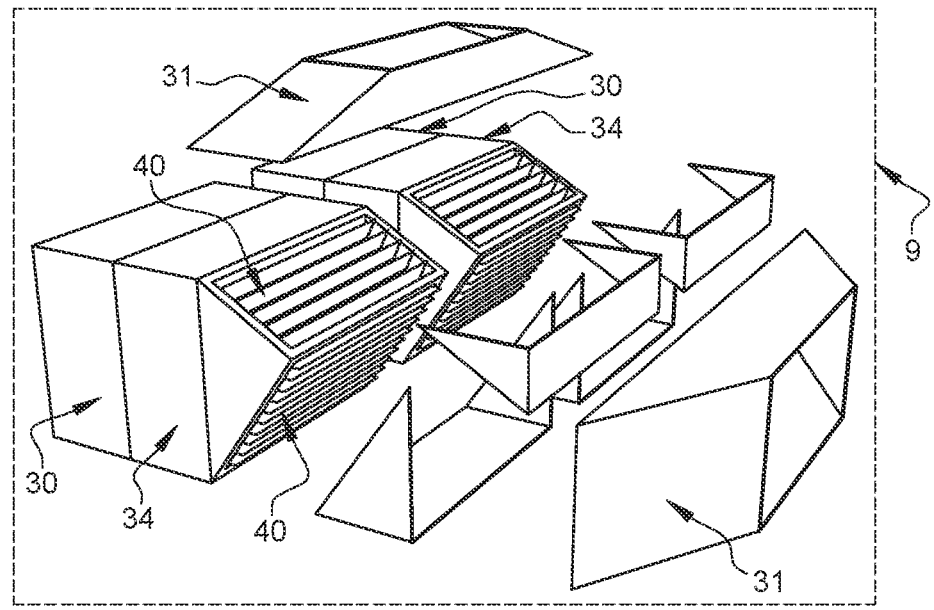
FIG. 22 shows a schematic view of the auxiliary parts that are part of an air conditioning unit such as that of the present invention.

FIGS. 22; 23 and 24 show schematic views of air conditioning systems with their auxiliary equipment installed. These are made up of fans (30) that push or suck the air that passes through the heat exchanger (34); inside the heat exchanger, pipes (8) forming a coil, absorb or release the heat of the fluid that passes through them; the heat exchanger (34) is connected to the force unit (10) through the main pipes (12), passing the fluid that is compressed inside it and reaching the pipe (8), for expelling or introducing the cold or heat or the heated or cooled fluid as the case may be. There are ventilation pipes or ducts or the like (31) and ventilation gates (40) for controlling the air flow entering the ducts.

The system can also consider heaters that can heat the pipes (8) through resistors or the like, in the case of ice on the exterior surfaces of the pipes among other reasons; radiators, heat exchangers (34) that fulfill the function to transfer the heat from one medium to another, thermostats connected at different points of the heat exchangers in order to deliver the information to the control system, humidifiers, directional control valve or the like (37) in the case of cooling or heating a fluid connected to the outlet of the heat exchangers to direct the heated or cooled fluid to a certain location, directional control valve (38) connected between the heat exchangers and the pump or compressor or the like for alternating the flow to be compressed between two or more circuits.

In some configurations the directional control valve (38) is not required, among others, all connected through wired and wireless circuits (FIG. 22). In addition, the direction of the fans or ventilation gates (40) as well as the directional control valve or the like (37) can be reversed in the case of cooling or heating a fluid, for using the system in heating or cooling mode.

Figure 23:
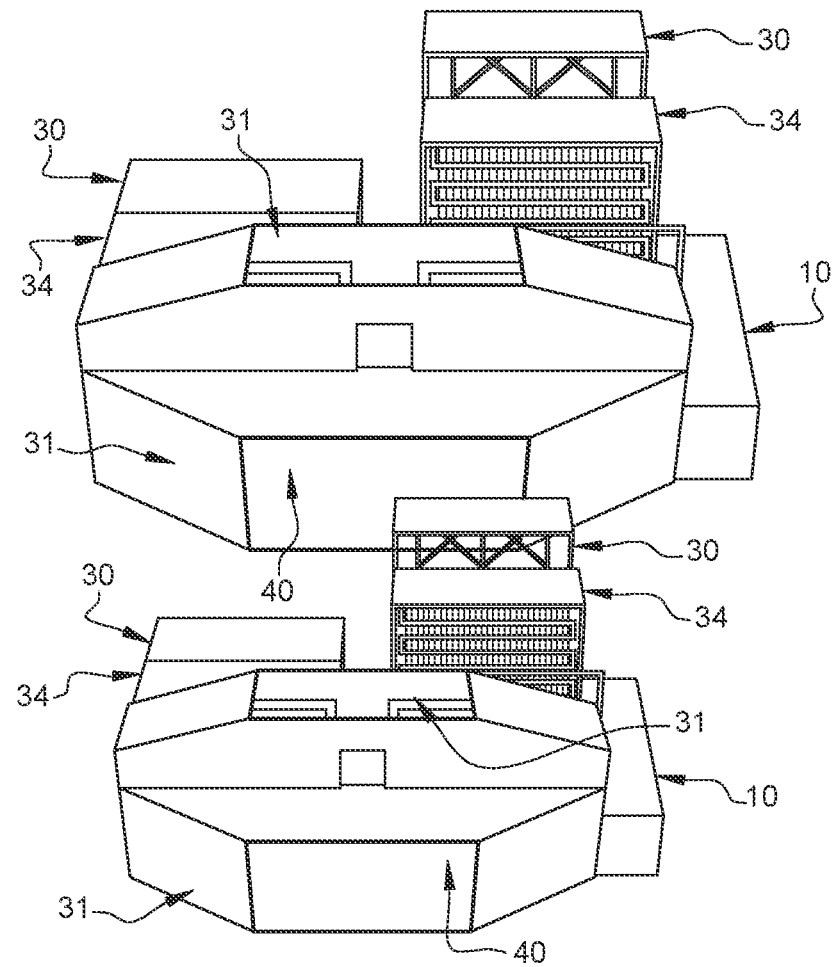
FIG. 23 shows a schematic view of two cascade-connected air conditioning units, in accordance with one of the principles on which the present invention is based.
Figure 24:
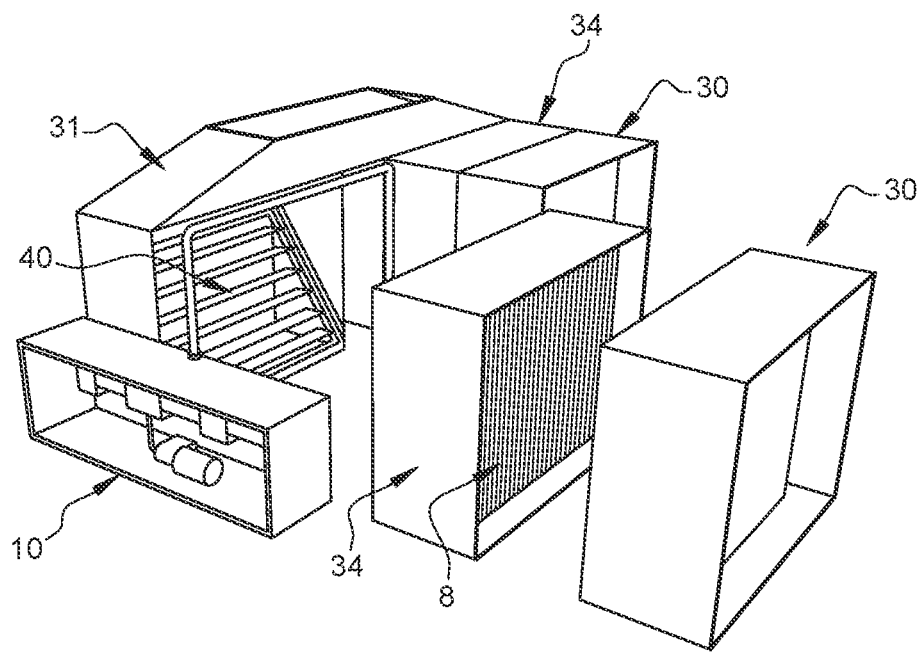
FIG. 24 shows a schematic view of an air conditioning equipment type, which exemplifies the present invention.
Figure 25:
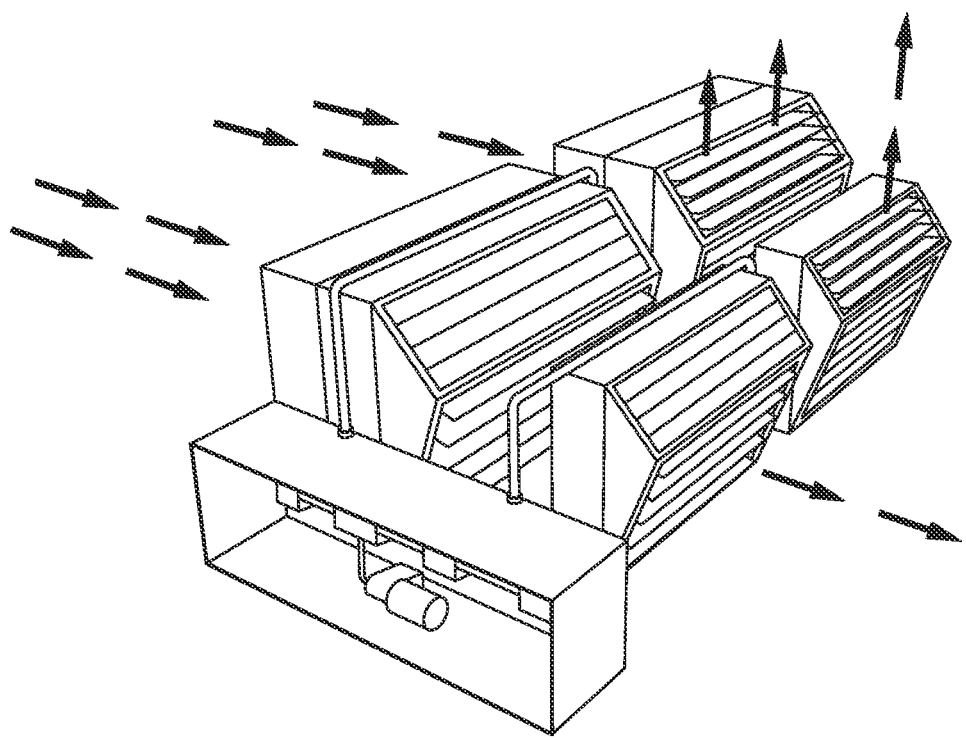
FIG. 25 shows a schematic view of a system of four circuits cascaded together.
Figure 26:
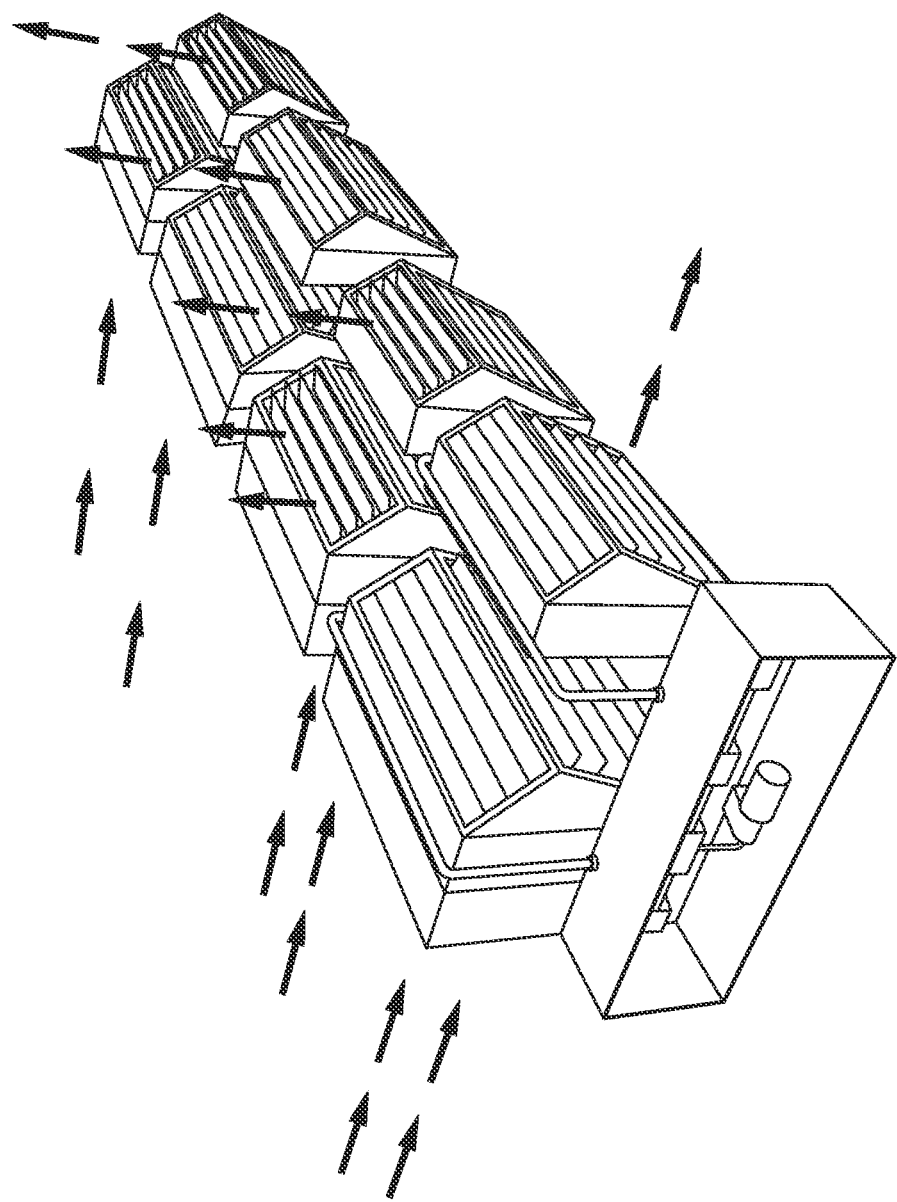
FIG. 26 shows a schematic view of a system of eight linked circuits operating in cascade.

In order to reduce the temperature difference of the ambient or medium, the system allows connecting to other traditional air conditioning systems, or even, connecting with one or more systems with the same characteristics or between two or more confined circuits connected by one, two or more force units (10), wherein this connection may be in series or in cascade, this means, reducing the number of circuits according to the direction of the medium flow to which the heat has been transferred. For example, if in the first line, 4 circuits are in operation (2 systems), in the second line, 2 circuits will be in operation. The medium flow for transferring heat would also decrease, 100% of the flow would enter the first line, in the process, 50% would be expelled and the remaining 50% of the flow would enter the second circuit line and the second circuit 50% would be expelled again, and so on (FIGS. 25 and 26). This methodology may work by placing successive systems of different sizes, or by placing the same number of circuits, but disconnecting 50% of the circuits on the next line in relation to the previous one, this last configuration allows the operation of the systems to be reversed (FIGS. 23 and 24).

The fluid can be any type of fluid that is compressible and expandable, so when compressed and decompressed it can release or absorb heat as the case may be, and this transfer may be greater as a result of the complete or partial state change of this fluid, such as liquid to solid or partially solid and vice versa, by way of illustration, but which should not be interpreted as limiting the scope of the fluids to be used, the fluid can be water, $CO_2$, a mixture of water with calcium chloride or any substance with a latent heat that when it changes state at a certain temperature and pressure, that can be different for each fluid, is capable of absorbing or releasing heat, these fluids can be organic, inorganic and eutectic, called "PCM" phase change fluids (Phase Change Material or Phase Change Material).

Pressure lesser than atmospheric pressure may be apply or pressure may be taken off the circuit for obtaining state changes at a temperature lower than the solidification temperature or at the temperature change from solid to solid state, or solid to liquid and vice versa, or from state changes above mentioned of a certain fluid at atmospheric pressure, this in order to choose a fluid that has its state change at atmospheric pressure at an average ambient temperature, depending on the area, such as be able to apply lower positive and negative pressures (pressures lower than atmospheric pressure), because the greater the temperature difference between the temperature at which the state change occurs at atmospheric pressure, and the temperature at which passes the air or liquid for cooling or heating, the greater the difference pressure to which the fluid will have to be subjected, so if the method and system were not used with pressure lower than atmospheric pressure, the temperature at which the fluid changes state to atmospheric pressure will have to be lower because that would have to be the minimum temperature at which the method and system will be able to work, limiting its use, and therefore a fluid that has its state change at atmospheric pressure at a very low temperature would have to be chosen, and very high pressures for produce the state change will always have to be exerted, unlike if the fluid changes state at a higher temperature or average temperature of the air or fluid that passes through these pipes, pressures greater than atmospheric pressure or lower than atmospheric pressure may be exerted in the event that the temperature of the air or liquid to be heated or cooled is less than the state change temperature of the fluid at atmospheric pressure. This is controlled by entering or withdrawing more or less fluid within the pipes with a filling valve (33) or the like, and if it is required displacing the state change temperature to a higher temperature (displacing the Pressure-Temperature curve to the right) because the temperature of the air or liquid that passes through the heat exchangers or the like has increased, and very high pressures are not wanted to be exerted, when the plunger of the linear intensifier pump or the like is centered each circuit will be pushing a face of the piston (2) or the like, so there will be pressure within both circuits, and for the fluid to necessarily change state, the temperature for this to occur will have to be higher than the temperature at which the fluid changes its state with atmospheric pressure, and in the same way, when removing fluid from the circuits, when the plunger of the linear intensifier pump or the like is centered, the circuits will be sucking the piston (2) or the like, exerting a negative pressure or a pressure lower than atmospheric pressure, and for the fluid to change state necessarily the temperature will have to be lower than the temperature at which the fluid changes state with atmospheric pressure. All this causes energy savings, since approximately twice as much energy is required to reach, for example, 0 to 80 Mpa than 0 at 40 Mpa added to 0 at −40 MPA (at the same amount of pressure but negatively). Two double-acting pistons placed in front of each other (face of a piston over the face of the other piston) can also be used, so that the piston of one compresses the piston of the other cylinder, and vice versa for causing negative pressure, these pistons would comply the same function of the intensifier pump.

So, if a fluid solidifies at 15 degrees Celsius at atmospheric pressure, a negative pressure is needed to produce a state change at 10 degrees Celsius.

This system can be used both for heating or cooling air and for heating or cooling a fluid such as water FIGS. 17, 19, 20, 21). In the case of cooling a fluid such as water, it can be returned after using (41) as shown in FIG. 21, the same can happen in the case of air.

Specifically, the present invention also describes a system for producing heat transfer between two or more media, allowing domestic, commercial or industrial use, comprising:

(a) one or more force units capable of increasing or decreasing the pressure of a fluid;

(b) a confined pipeline circuit;

wherein the confined pipeline circuit comprises one or more pipes for forming a confined pipeline circuit or the like, which is closed at one of its ends; wherein part of the pipes are pipes with plates or fins, or the like, these may be capillaries or the like.

Wherein the force unit comprises a device capable of increasing or decreasing the pressure of a fluid, plunger type, piston or the like, a pump or the like for moving the device.

In addition, the system may contain:

(a) a control system that controls pressure and contraction so as to cause the state change of the fluid, from the liquid or supercritical fluid state to the solid or partially solid state and vice versa, gaseous to liquid and vice versa;

(b) one or more confined circuit pressure and temperature sensors that deliver information to the control system;

(c) one or more electronically driven servo brakes or control valves or the like that are part of the one or more force units, which are connected to the automatic control system;

(d) heat exchanger (34);

(e) ventilation ducts for expelling or introducing heat or cold as the case may be (31);

(f) cooling tower or heat exchanger (42) or the like;

(g) ventilation gates (40) or the like, which controls the air flow entering the ventilation pipes or ducts or the like, for expelling or introducing heat or cold as the case may be;

(h) an external source of heat to support the cooling or heating of the fluid;

(i) fans and/or ventilation gates (40) that can be reversed in order to use the system in heating or cooling mode;

(j) pump for displacing the fluid through the heat exchanger (34), which can reverse direction for using the system in heating or cooling mode;

(k) heat exchanger (42).

The force units of the system are pistons, hydraulic cylinder pistons, pressurizing pump, hydraulic pump, linear intensifier pump or the like, rotary direct drive pump or the like, plunger pump or the like, electric motor or the like, directional control or other electronically driven valve, in addition to other components such as electronically driven actuators and servobrakes, fill valve, relief valve or the like.

On the other hand, the system can use more than one circuit, if so, these can be connected to one or more force units, wherein these force units together with the control system control the temperature of each circuit.

When two or more circuits are used and a linear intensifier pump or the like is used for produce the balance effect, it will fulfill the function of leaving the piston in its minimum stroke on a first side of the circuit, compressing it and leaving the piston in its maximum stroke on a second side of the circuit, decompressing it; compressing and decompressing that causes a heat transfer due to the state change of the fluid inserted into the pipes (8). Said balance effect may also be carried out with a servobrake or control valve, or the like activated or deactivated, wherein compression is produced when activated, and decompression occurs when deactivated. When the fluid is decompressed and expanded, the control valve (37) or the like controlled by the control system returns this expanded fluid to the plunger pump or the like.

The system also allows connecting to a traditional air conditioning system in order to reduce the temperature difference with respect to the fluid that will change state. This means reducing or increasing the temperature of the ambient or medium that is going to enter the heat exchanger of this new system, constituting the complex system into a hybrid system.

Another characteristic is that the system serves as a support for decreasing or increasing the temperature of the ambient or medium for the condenser or evaporator of current systems for working with a lower load.

For increasing its range, more than one system can be connected, this can be in series or in cascade, in order to increase the temperature gradient.

APPLICATION EXAMPLES

Eight examples are given below by way of illustration, which should not be construed as limiting the scope of the present invention:

Example 1

Two confined circuits consisting of steel pipes are built, which will have the design pressure of 1115 Mpa as a result of the equation P(VI), for achieving solidification at the required temperature and operating, for this case, at temperatures between −21° C. and 30° C., so the pressures within the system for this case will range between 210 and 1050 Mpa. The circuit is made up of a main pipe (12) with an internal diameter of 0.5 mm and a thickness of 1.5 mm, 4 meters long. At one of its ends, hereinafter end (19), a pipe (17) with an internal diameter of 1 mm, with a thickness of 4.26 mm and a length of 50 mm is inserted, connected therein to a pressure intensifier that is part of the force unit (10) of length 482 mm and diameter of 152 mm, on this, connected through a pipe of 10 cm is a piston (2) with a diameter of 15.87 mm, that will move in both directions alternately within of the cylinder, displaced by the alternative action of the fluid that changes its volume, as a consequence of its changes of state. The piston (2) is also part of the force unit (10), which for this example will be called "force unit 1", it has a sensor that allows the entry of filling fluid to be controlled if necessary through a fill valve, and for controlling the pressure through a relief valve, and, in this case, a hydraulic cylinder piston or the like, part of force unit 1, with 400 W of power that compresses the piston to change the state fluid, together with an electronically driven one-way valve connected between the piston and the intensifier. At 0.1 meters from the end, called end (20), said end located at 4 meters from end (19) for this example is connected to the control system (11) through the pipes. The system is also made up of two thermostats, a pressure switch, two fans, a heater and cooler, which in this case are Peltier cells, hereinafter "auxiliary equipment", with a power of 100 W, the heater and cooler perform the function of increasing or decrease the fluid temperature if necessary, this increase or decrease in temperature together with the help of compression and decompression close the cycle.

At the other end of the main pipe (12), end (21) located at four meters from end (19) for this example, a first pipe (13) is connected, wherefrom a manifold pipe (22) emerges, in this case, it is a manifold, wherein a first plurality of pipes (8) are connected, which in this case are capillaries or the like. The manifold pipe (22) has an internal diameter of 1 mm and a thickness of 4.26 mm and a length of 10 centimeters. Capillary pipes (8) or the like have an internal diameter of 0.5 mm and a thickness of 1.5 mm, and have a length of 500 meters each, forming a coil or radiator of 100 centimeters long and 50 centimeters high, also connected to the Peltier cells or the like. The pipes (8) are connected to this manifold pipe (22), which is connected to the first pipe (13) that has an internal diameter of 1 mm and a thickness of 4.26 mm and 5 centimeters long. In this example a total of 3 capillary pipes are connected to the manifold pipe (22), which are connected 33 mm apart from each other along the manifold pipe (22). For this case, the force unit 1, which is made up of two hydraulic cylinder pistons connected to an axis and two connecting rods or the like, FIG. 15 that will connect both circuits, also made up of two pressure intensifiers, and two electronically driven one-way valves or the like, in addition to two pistons with two filling valves and two relief valves, all connected to the control system (11).

Distilled water, hereinafter "water", is preferably introduced, and subsequently the hydraulic cylinder pistons of force unit 1 compress the pistons, removing all the air from the system and leaving only the water, closing the free ends with a pipe plug.

Subsequently, with the displacement of the hydraulic cylinder pistons or the like, the pressure in both circuits will be increased at 20.8 Mpa, due to the work of the pressure intensifier, the pressure of the circuit will reach 208 Mpa (the intensifier has a ratio of 1:10) subsequently in the case of absorbing heat, the water will be cooled at −21° C., keeping the water in a liquid state, subsequently the hydraulic cylinder piston 1 will compress the water at 22 Mpa, obtaining an outlet pressure in the intensifier of 220 Mpa, within the circuit for this example 1, compression that starts when this circuit is at its maximum travel, until it solidifies. While this occurs, the piston of the opposite circuit (circuit 2) will be located in its maximum stroke, while this occurs, the filling valve or the like of that circuit 2 will be open for entering water into this circuit 2, subsequently the hydraulic cylinder piston of this second circuit will compress the piston 2, and increasing the pressure with the pressure intensifier, until the water in the second circuit solidifies.

Each circuit works the same way.

The force unit 1, in combination with the thermal process of heat transfer, makes the internal pressure of each circuit vary and with it the state changes of the water take place. The aforementioned process, together with the action of the one-way valve or the like of the force unit 1, prevents the piston from returning and leaves it at its minimum travel point, producing during this contraction, the state change of the water from liquid to solid state (ice III, or ice V, or ice VI), for example, absorbing heat with the melting of ice III at a water temperature in the pipes of −21 degrees Celsius with the temperature of the other medium above it, and at that same moment giving up heat with the transformation from liquid to solid of the opposite circuit, since the one-way valve or the like will prevent the water from continuing expanding when it is in a partially liquid phase, because the water will push the piston without being able to displace it, causing with the help of force unit 1, an increase in pressure that will cross the melting/solidification curve and this will start its solidification process. When starting this process, the water will decrease its volume due to partial solidification, in the case of the ice Ih, it will increase its volume working inversely, which will cause a displacement of the piston and a decrease in pressure, which in turn will cause the water to return under the curve and repeat the process successively until the water is completely or almost completely compressed in the solid state. The hydraulic cylinder piston of the same force unit will serve as a support for accelerating the return of the piston, if necessary, along with the pushing action (balance effect) of the opposite circuit on the piston when it expands, while the piston of this opposite circuit, simultaneously, it will be carrying out the process of inverse state change, that is, from solid to liquid. These processes are carried out through a heat transfer process. During these processes, the control system that receives information about the position of the pistons and two temperature and pressure sensors, each one placed in the capillary pipes of each secondary pipe in each circuit, obtain information on the temperature inside them and the external temperature. The function of the control system is for controlling the state changes through the force unit 1, it controls the components and auxiliary equipment, for example, it controls the ventilation gates (40) so that the flow of cold air or heat is expelled or introduced through the ventilation duct (31) to a certain place as the case may be. Also, in order to avoid exceeding the maximum design pressure when the system stops, the control system will activate the relief valve or the like, for releasing pressure.

Because water in its solid state (ice II, or ice III, or ice V or ice VI as the case may be) at that pressure has a higher density than liquid water, when the state change from solid state to liquid state occurs, a volume change occurs (in the case of ice Ih will be inverse) of approximately between 2 to 11% depending on the pressure at which the fluid will be in that phase change, and this change causes the system to absorb and when the state change from liquid or partially liquid to solid or partially solid state occurs, the system releases heat, which in this case has a thermal capacity for absorbing or releasing of 30,000 BTU/h.

This process is repeated continuously, throughout the day as required. The control system will control the initial temperature of the water so that the desired temperature is reached. The water will release heat when it solidifies and will absorb heat when it melts. All this absorbed or transferred heat will produce the state changes above mentioned.

The direction of the fans will be reversed for use in heating or cooling mode.

Example 2

Two confined circuits are constructed consisting of steel pipes, which will have the design pressure of 1115 Mpa as a result of the equation P(VI), so that they can solidify at the required temperature and they work for this case at temperatures between −21° C. and 30° C., so the pressures within the system for this case will range between 210 and 1050 Mpa. The circuit is made up of a main pipe (12) with an internal diameter of 0.5 mm and a thickness of 1.5 mm, 4 meters long. At one of its ends, hereinafter end (19), a pipe (17) with an internal diameter of 1 mm, with a thickness of 4.26 mm and a length of 50 mm, connected therein to a linear intensifier pump, hereinafter "the intensifier", which is part of the force unit (10) FIG. 17, with a length of 482 mm and a diameter of 152 mm, inside of which there is a cylinder piston (2) that will move in both directions alternately, displaced by the alternative action of the fluid in each circuit that changes its volume as a consequence of its state changes. The intensifier has a sensor that allows the control of the inflow of filling fluid, if necessary, through a filling valve, and for controlling the pressure through a relief valve, and in this case, a hydraulic pump (32) together with a directional control valve and other typical elements of a linear intensifier pump, parts of force unit 1 with a power of 440 W, which compresses the piston for changing the state fluid. At 0.1 meters from the end, called end (20), said end located at 4 meters from the end 19, for this example, connected to the control system (11) through the pipes, which is composed of two thermostats, a pressure switch, two fans of 30 W each, hereinafter "auxiliary equipment", the heater and cooler performs the function of increasing or decreasing the temperature of the fluid if necessary, this increase or decrease in temperature together with the help of the compression and decompression close the circuit.

At the other end of the main pipe (12), said end (21) located at 4 meters from end (19) for this example, a first pipe (13) is connected, from where a manifold pipe (22) emerges, which in this case, it is a manifold, wherein a first plurality of pipes (8) is connected. The manifold pipe (22) has an internal diameter of 1 mm. and a thickness of 4.26 mm and a length of 10 centimeters.

Capillary pipes (8) or the like have an internal diameter of 0.5 mm and a thickness of 1.5 mm, which have a length of 500 meters each, forming a coil or radiator with 100 centimeters long and 50 centimeters high, also connected with the Peltier cells or the like. The pipes (8) connected to this manifold pipe (22) and is connected to the first pipe (13) that has an internal diameter of 1 mm. and a thickness of 4.26 mm and 5 centimeters long. In this example a total of 3 capillary pipes are connected to the manifold pipe (22), which are connected 33 mm apart from each other along the manifold pipe (22). In this case, the force unit 1 connected to a control system (11) will connect both circuits.

Distilled water is preferably introduced, hereinafter "water", and subsequently the power unit 1 compresses the system, removing all the air from it and leaving only the water, closing the free ends with a pipe plug.

Subsequently, with the displacement of the intensifier piston, the pressure of the circuits will be increased at 100 Mpa through the linear intensifier pump and with the help of the hydraulic pump, (the intensifier has a ratio of 1:20) subsequently, for the case of absorbing heat in a medium for which the air passes at −10° C. as a system that needs cooling, air is recirculated from the system cooled by circuits one and two, a system previously cooled by common air conditioning equipment, the air will cool the water at −10° C. of circuits one and two, while this occurs, the pressure of circuit one will be increased by 30 MPA reaching 130 MPA in this circuit, keeping the water in a liquid state in circuit one, since it will be under a pressure of 130 MPA, making it higher than the pressure necessary for the water for transforming into ice Ih at −10° C., instantaneously the intensifier piston through the hydraulic pump will decompress the water in circuit two by 70 Mpa, the water in the second circuit will solidify because it will be transforming into ice Ih and will release heat, while the water in circuit one will remain liquid. Subsequently, when circuit two has completely or partially solidified, its pressure will increase at 130 Mpa and the pressure of circuit one will decrease at 70 Mpa, so circuit one will release heat and circuit two will absorb heat because it will be melting, and so on, it will alternately compress and decompress each circuit, absorbing and releasing heat, and the air passing through the circuit that is absorbing heat will re-enter the refrigeration system and the air passing through the circuit that is giving heat will be removed to the exterior. Controlled ventilation will be used due to the low pressure that the place to be cooled may have.

Each circuit works the same way.

The force unit 1, in combination with the thermal process of heat transfer, makes the internal pressure of each circuit vary and with it the state changes of the water take place. The aforementioned process, together with the action of the components of force unit 1, prevents the piston from returning and leaves it at its minimum point of travel, producing during this contraction the state change of the water from liquid to solid state (ice III, or ice V, or ice VI), by way of example, absorbing heat with the melting of ice III at a water temperature in the pipes of −21 degrees Celsius with the temperature of the other medium above it, and at that same moment, releasing heat with the transformation from liquid to solid of the opposite circuit, because the one-way valve or the like will prevent the water from continuing expanding when it is in a partially liquid phase, because the water will push the piston without being able to displace it, causing with the help of force unit 1, an increase in pressure that will cross the melting/solidification curve (in the case of ice Ih a decrease in pressure) and it begins its solidification process. When starting this process, the water will decrease its volume due to partial solidification (in the case of ice Ih it will increase its volume working inversely), which will cause a displacement of the piston and a decrease in pressure, which in turn will cause the water to be again under the curve and the process is repeated again successively until the water is completely or almost completely compressed in the solid state. The hydraulic pump (32) of the same force unit will exert pressure for accelerating the return of the piston, together with the pushing action of the opposite circuit on the piston as it expands, while the piston of this opposite circuit will be simultaneously carrying out the reverse state change process, that is, from solid to liquid. These processes are carried out through a thermal and mechanical heat transfer process. During these processes, the control system that receives information about the position of the pistons and two temperature and pressure sensors, each placed in the pipes (8) of each secondary pipe in each circuit, obtain information on the temperature inside them and the external temperature. The function of the control system is for controlling the state changes through the force unit 1, it controls the components and auxiliary equipment, for example, it controls the ventilation gates (40) so that the flow of cold air or heat is expelled or introduced through the ventilation duct (31) to a certain place as the case may be. Also, in order to avoid exceeding the maximum design pressure when the system stops, the control system will activate the relief valve or the like, for releasing pressure.

Because water in its solid state (ice II, or ice III, or ice V or ice VI as the case may be) at that pressure has a higher density than liquid water, when the state change from solid state to liquid state occurs, a volume change occurs of approximately between 2 to 11% depending on the pressure at which the fluid will be in that phase change (in the case of ice Ih the density is less), and this change produces that the system absorbs, and when the change from a liquid or partially liquid state to a solid or partially solid state occurs, the system transfers heat, which in this case has a thermal capacity for absorbing or transferring about 30,000 BTU/h.

This process is repeated continuously, throughout the day as required. The control system will control the initial temperature of the water so that the desired temperature is reached. The water will release heat when it solidifies and it will absorb heat when it melts. All this absorbed or transferred heat will produce the state changes above mentioned.

The direction of the fans will be reversed for use in heating or cooling mode.

Example 3

A confined circuit consisting of steel pipes is built, which will have the design pressure of 1115 Mpa as a result of the equation P(VI), so that it can solidify at the required temperature and operate in this case at temperatures between −21° C. and 30° C., so the pressures within the system for this case will range between 210 and 1050 Mpa. The circuit is made up of a main pipe (12) with an internal diameter of 0.5 mm and a thickness of 1.5 mm, 4 meters long. At one of its ends, hereinafter end (19), a pipe (17) with an internal diameter of 1 mm, with a thickness of 4.26 mm and a length of 50 mm, is inserted, connected therein to a pressure intensifier that is part of the force unit (10) with a length of 482 mm and diameter of 152 mm, on which it is connected through a pipe of 10 cm, a piston (2) with a cylinder of diameter of 15.87 mm that will move in both directions alternately, and displaced by the alternative action of the fluid that changes its volume as a consequence of its state changes. The piston (2) is also part of the force unit (10), which for this example, it will be called "force unit 1", it has a sensor that allows the entry of filling fluid to be controlled if necessary through a fill valve, and control the pressure through a relief valve and in this case a hydraulic cylinder piston or the like, part of force unit 1, with a power of 440 W, that compresses the piston for changing the state fluid, together with an electronically driven one-way valve connected between the piston and the intensifier. At 0.1 meters from the end, called end (20), said end located at 4 meters from end (19) for this example, is connected to the control system (11) through the pipes, which is composed of two thermostats, a pressure switch, two fans (30) of 30 W each, hereinafter "auxiliary equipment", the heater and cooler performs the function of increasing or decreasing the fluid temperature if necessary, this increase or decrease in temperature together with compression and decompression aids close the circuit.

Figure 16:
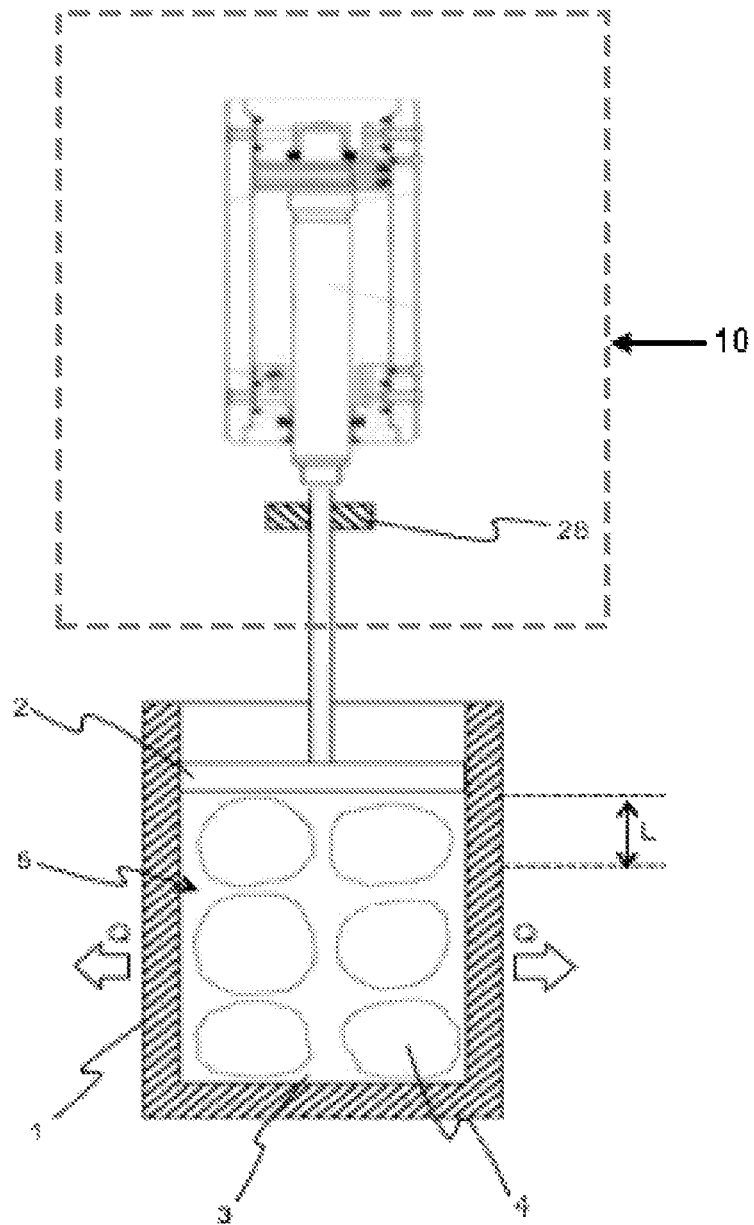
FIG. 16 shows a schematic view of a cylinder/piston system connected through a force unit.

At the other end of the main pipe (12), end (21) located at 4 meters from end (19) for this example, a first pipe (13) is connected, from where a manifold pipe (22) emerges, which in this case, it is a manifold, wherein a first plurality of pipes (8) are connected, which in this case, are capillaries or the like. The manifold pipe (22) has an internal diameter of 1 mm, and a thickness of 4.26 mm and a length of 10 centimeters. Capillary pipes (8) or the like have an internal diameter of 0.5 mm and a thickness of 1.5 mm, which have a length of 500 meters each, forming a coil or radiator with 100 centimeters long and 50 centimeters high, also connected with the Peltier cells or the like. The pipes (8) connected to this manifold pipe (22) and is connected to the first pipe (13) that has an internal diameter of 1 mm. and a thickness of 4.26 mm and 5 centimeters long. In this example, a total of 3 capillary pipes are connected to the manifold pipe (22) which are connected 33 mm apart from each other along the manifold pipe (22). For this case, the force unit 1, which is made up of a hydraulic cylinder piston connected to an axis or the like, FIG. 16, is connecting both circuits, and is also made up of a pressure intensifier, and an electronically operated one-way valve or the like, in addition to a piston with a fill valve and relief valve all connected to the control system (11).

Distilled water, hereinafter "water", is preferably introduced, and subsequently the hydraulic cylinder piston of force unit 1 compresses the piston, removing all the air from the system and leaving only the water, closing the free ends with a pipe plug.

Subsequently, with the displacement of the hydraulic cylinder piston, subsequently in the case of releasing heat, the water will be heated at 30° C., keeping the water in a liquid state, subsequently the hydraulic cylinder piston 1 will compress the water at 112 Mpa, obtaining an outlet pressure of the intensifier of 1120 Mpa, inside the circuit for this example 1, compression that starts when this circuit is at its maximum travel, until it solidifies.

Each circuit works the same way.

The force unit 1, in combination with the thermal process of heat transfer, makes the internal pressure of each circuit vary and with it the state changes of the water take place. The aforementioned process, together with the action of the one-way valve or the similar of the force unit 1, prevents the piston from returning and leaves it at its minimum point of travel, producing during this contraction the state change of the water from liquid to solid state (ice III, or ice V, or ice VI), for example, absorbing heat with the melting of ice III, at a water temperature in the pipes of −21 degrees Celsius, with the temperature of the other medium above it, and at that same moment releasing heat with the transformation from liquid to solid of the opposite circuit, since the one-way valve or the like will prevent the water from continuing expanding when it is in a partially liquid phase, since the water will push the piston without being able to displace it, causing with the help of the force unit 1 an increase in pressure that will cross the melting/solidification curve and this will begin its solidification process. When starting this process, the water will decrease its volume due to partial solidification, in the case of the Ih ice, it will increase its volume working inversely, which will cause a displacement of the piston, and a decrease in pressure, which in turn will cause the water to return under the curve, and repeat the process successively until the water is completely or almost completely compressed in the solid state. The hydraulic cylinder piston of the same force unit will serve as a support for accelerating the return of the piston, if necessary. These processes are carried out through a thermal and mechanical heat transfer process. During these processes, the control system that receives information about the position of the piston, and a temperature and pressure sensor, each placed in the capillary pipes of the secondary pipe in each circuit, obtain information on the temperature within them and the external temperature. The function of the control system is controlling the changes of state through the force unit number 1, it controls the components and auxiliary equipment, for example, it controls the ventilation gates (40) so that the flow of cold air or heat is expelled or introduced through the ventilation duct (31) to a certain place as the case may be. Also, in order to avoid exceeding the maximum design pressure when the system stops, the control system will activate the relief valve or the like, for releasing pressure.

Because water in its solid state (ice II, or ice III, or ice V or ice VI as the case may be) at that pressure has a higher density than liquid water, when the state change from solid state to liquid state a volume change occurs (in the case of ice Ih will be inverse) of approximately 2 to 11% depending on the pressure at which the fluid will be in that phase change, and this change causes the system to absorb and when the change from a liquid or partially liquid state to a solid or partially solid state occurs, the system transfers heat, which in this case has a thermal capacity for absorbing or transferring about 30,000 BTU/h.

This process is repeated continuously, throughout the day as required. The control system will control the initial temperature of the water so that the desired temperature is reached. The water will release heat when it solidifies and it will absorb heat when it melts. All this absorbed or transferred heat will produce the state changes above mentioned.

The direction of the fans or the dampers (40) will be reversed for use in heating or cooling mode.

Example 4

Two confined circuits consisting of copper pipes are built, which will be the result of the Clausius-Clapeyron equation with a design pressure of 1 Mpa, and working, for this case, at temperatures between −40° C. and 30° C., so the pressures within of the system, for this case, will range between 1 Pascal and 1 Mpa. The circuit is made up of a main pipe (12) with an internal diameter of 9 mm and a thickness of 0.3 mm, 4 meters long. At one of its ends, hereinafter end (19), a pipe (17) with an internal diameter of 9 mm, with a thickness of 0.3 mm and a length of 50 mm is inserted, connected therein to a linear intensifier pump, hereinafter "the intensifier" which is part of the force unit (10) (FIG. 17), long 482 mm and diameter of 152 mm, inside which there is a cylinder piston (2) that will move in both directions alternately, displaced by the alternative action of the fluid, in each circuit that changes its volume as a consequence of its state changes. The intensifier has a sensor that allows the inflow fluid to be controlled, if necessary, through a filling valve, and the pressure is controlled through a relief valve, and in this case, a hydraulic pump together with a directional control valve and other typical elements of a linear intensifier pump, parts of force unit 1 that compresses the piston to change the state fluid. At 0.1 meters from the end, called end (20), said end located at 4 meters from end (19) for this example is connected to the control system (11) through the pipes, which is composed of two thermostats, a pressure switch, two fans (30) of 30 W each, a heater and a cooler that in this case are Peltier cells with a power of 500 W, hereinafter "auxiliary equipment", the heater and cooler performs the function of increasing or decreasing the temperature of the fluid if necessary, this increase or decrease in temperature together with the help of compression and decompression close the cycle.

At the other end of the main pipe (12), end (21) located at 4 meters from end (19) for this example, a first pipe (13) is connected, wherefrom a manifold pipe (22) emerges, in this case, it is a manifold, wherein a first plurality of pipes (8) are connected, in this case, which are capillaries or the like. The manifold pipe (22) has an internal diameter of 9 mm. and a thickness of 0.3 mm and a length of 10 centimeters. Capillary pipes (8) or the like have an internal diameter of 6 mm and a thickness of 0.3 mm, which are 500 meters long each, forming a coil or radiator, 100 centimeters long and fifty centimeters high, connected also with Peltier cells or the like. The pipes (8) connected to this manifold pipe (22), which is connected to the first pipe (13), which has an internal diameter of 9 mm, and a thickness of 0.3 mm, and 35 centimeters long. In this example a total of 6 capillary pipes are connected to the manifold pipe (22), which are connected 50 mm apart from each other, along the manifold pipe (22). In this case, the force unit 1 connected to a control system (11) will connect both circuits.

Distilled water is preferably introduced, hereinafter "water", and subsequently the power unit 1 compresses the system, removing all the air from it and leaving only the water, closing the free ends with a pipe plug.

Subsequently, the intensifier removing water through both circuits will decrease the pressure in both circuits at 1 Pascal transforming the water from a liquid to a gaseous state, subsequently, in the case of absorbing heat, the water will be cooled at −25° C., keeping the water in a gaseous state, subsequently the intensifier piston will slowly decrease the suction in the water of a circuit, for increasing the pressure, for producing the change of state, inside the circuit for this example, circuit 1, the suction starts when this circuit is in its minimum travel, until it becomes gaseous. While this occurs, for the opposite circuit (circuit 2) the piston will be located at its maximum stroke, while this occurs, the filling valve or the like of that circuit 2 will be open for drawing water to this circuit 2, subsequently the hydraulic cylinder piston of the force unit will decompress the chamber, reducing the pressure with the intensifier, until the water in the second circuit turns into gaseous.

Each circuit works the same way.

The force unit 1, in combination with the thermal process of heat transfer, makes the internal pressure of each circuit vary and with it, the state changes of the water take place. The aforementioned process, together with the action of the components of force unit 1, prevents the piston from returning and leaves it at its minimum point of travel, producing during this contraction the state change of the water from liquid to gaseous state, by way of example, absorbing heat with the transformation of liquid water to steam or gaseous, at a water temperature in the pipes of −21 degrees Celsius, with the temperature of the other medium above it, and at that same moment, releasing heat with the transformation of vaporized water to liquid in the opposite circuit, due to the fact that the one-way valve or the like will prevent the water from continuing expanding, when it is in a partially gaseous phase, since the water will push the piston without being able to displace it, causing with the help of the force unit 1, a decrease in pressure that will cross the vaporization curve and starts its process of state change to liquid. When starting this process, the water will decrease its volume, which will cause a displacement of the piston. The suction caused by the circuit that is contracting, will serve as support for the piston that will be sucking the other circuit, while this other circuit, simultaneously, will be carrying out the reverse state change process, that is, from liquid to gaseous. These processes are carried out through a thermal and mechanical heat transfer process. During these processes, the control system that receives information about the position of the pistons, and two temperature and pressure sensors, each placed in the pipes of each secondary pipe in each circuit, obtain information on the temperature inside them and the external temperature. The function of the control system is for controlling the changes of state through the force unit 1, it controls the components and auxiliary equipment, for example, it controls the ventilation gates (40) so that the flow of cold air or heat is expelled or introduced through the ventilation duct (31) to a certain place as the case may be. Also, for preventing the system from working when the system stops, the control system will activate the fill valve or the like to increase pressure.

Since water, in its liquid state, at that pressure, has a higher density than gaseous water, when the state change from liquid to gaseous state occurs, a change in volume occurs, and this change causes the system to absorb, and when the state change occurs from a gaseous, or partially gaseous state, to a liquid, or partially liquid state, the system transfers heat, which in this case, has a thermal capacity for absorbing or transferring about 15,000 BTU/h.

This process is repeated continuously, throughout the day as required. The control system will control the initial temperature of the water, so that the desired temperature is reached. The water will release heat when it turns into a liquid, and it will absorb heat when it vaporizes. All this absorbed or transferred heat will produce the state changes above mentioned.

The direction of the fans or the dampers (40) will be reversed for use in heating or cooling mode.

Example 5

Two confined circuits made up of steel pipes are built, which will be the result of the Clausius-Clapeyron equation with a design pressure of 800 Mpa, and they work for this case at temperatures between −20° C. and 31° C., therefore that the pressures within the system for this case will oscillate between 200 and 750 Mpa. The circuit is made up of a main pipe (12) with an internal diameter of 0.5 mm and a thickness of 1.5 mm, 4 meters long. At one of its ends, hereinafter end (19), a pipe (17) with an internal diameter of 1 mm, with a thickness of 4.26 mm and a length of 50 mm is inserted, connected to a pressure intensifier that is part of the force unit (10) with a length of 482 mm and diameter of 152 mm, connected therein through a pipe of 10 cm, there is a piston (2) cylinder of diameter of 15.87 mm that will move in both directions alternately, displaced by the alternative action of the fluid that changes its volume as a consequence of its changes of state. The piston (2) is also part of the force unit (10), which for this example will be called "force unit 1", it has a sensor that allows the entry of filling fluid to be controlled if necessary through a filling valve, and controlling pressure through a relief valve, and in this case a hydraulic cylinder piston starts from force unit 1, which compresses the piston for changing the state fluid, together with an electronically driven one-way valve connected between the piston and intensifier. At 0.1 meters from the end, namely end (20), said end located at 4 meters from end (19) for this example, is connected to the control system (11) through the pipes, which is composed of two thermostats, a pressure switch, two fans (30), a heater and cooler, that in this case are Peltier cells with a power of 500 W, hereinafter "auxiliary equipment", the heater and cooler performs the function of increasing or decreasing the temperature of the fluid, if necessary, this increase or decrease in temperature together with the help of compression and decompression close the cycle.

At the other end of the main pipe (12), end (21) located at four meters from end (19) for this example, a first pipe (13) is connected, wherefrom a manifold pipe (22) emerges, which in this case it is a manifold, wherein a first plurality of pipes (8) are connected, which in this case are capillaries or the like. The manifold pipe (22) has an internal diameter of 1 mm and a thickness of 4.26 mm and a length of ten centimeters. Capillary pipes (8) or the like have an internal diameter of 0.5 mm and a thickness of 1.5 mm. which are 500 meters long, each forming a coil or radiator that is one hundred centimeters long and fifty centimeters high, which are also connected with the Peltier cells or the like. The pipes (8) are connected to this manifold pipe (22), and which is connected to the first pipe (13), that has an internal diameter of 1 mm and a thickness of 4.26 mm and 5 centimeters long. In this example; a total of 3 capillary pipes are connected to the manifold pipe (22), which are connected 33 mm apart from each other along the manifold pipe (22). For this case, the force unit 1 is made up of two hydraulic cylinder pistons connected to an axis, and two connecting rods or the like (FIG. 15) that will connect both circuits, also made up of two pressure intensifiers, and two electronically driven one-way valves or the similar, in addition to two pistons with two filling valves and two relief valves, all connected to the control system (11).

$CO_2$ is introduced, and then the hydraulic cylinder pistons of force unit 1 compress the pistons, removing all the air from the system and leaving only the $CO_2$, closing the free ends with a pipe plug.

Subsequently, with the displacement of the hydraulic cylinder pistons, the pressure in both circuits will be increased at 20.8 Mpa, due to the work of the pressure intensifier, the pressure of the circuit will reach 200 Mpa (the intensifier has a ratio of 1:10) subsequently, in the case of absorbing heat, the $CO_2$ will be cooled at −21° C., keeping the $CO_2$ in a liquid state, subsequently the hydraulic cylinder piston 1 will compress the $CO_2$ at 22 Mpa, obtaining an outlet pressure in the intensifier of 220 Mpa, within the circuit, for this example circuit 1, compression that begins when this circuit is at its maximum travel, until it solidifies. While this occurs the piston of the opposite circuit (circuit 2) will be located in its maximum stroke, while this occurs the filling valve or the like of this circuit 2 will be open for entering $CO_2$ into this circuit 2, subsequently the hydraulic cylinder piston of this second circuit will compress the piston 2, and increasing the pressure with the pressure intensifier, until the $CO_2$ in the second circuit solidifies.

Each circuit works the same way.

The force unit 1, in combination with the thermal process of heat transfer, varies the internal pressure of each circuit, and, with that, the state changes of the $CO_2$ take place. The aforementioned process, together with the action of the one-way valve or the like of the force unit 1, prevents the piston from returning and leaves it at its minimum point of travel, producing during this contraction the state change of the $CO_2$ of liquid state to solid state, for example, absorbing heat with the melting of $CO_2$, at a temperature of $CO_2$ in the pipes of −21 degrees Celsius, and the temperature of the other medium above it, and at that same moment, releasing heat with the transformation of liquid $CO_2$ to solid in the opposite circuit, since the one-way valve or the like will prevent $CO_2$ from continuing expanding when it is in a partially liquid phase, since $CO_2$ will push the piston without being able to displace it, causing with the help of the force unit 1, an increase in pressure that will cross the melting/solidification curve, and beginning its solidification process. When starting this process, the $CO_2$ will decrease its volume due to partial solidification, which will cause a displacement of the piston, and a decrease in pressure, which in turn will cause the $CO_2$ to return under the curve, and repeat the process successively until the $CO_2$ is completely or almost completely compressed in the solid state. The hydraulic pump (32) of the same force unit will serve as a support for accelerating the return of the piston, if necessary, along with the pushing action of the opposite circuit on the piston as it expands, while the piston of this opposite circuit, simultaneously, will be carrying out the reverse state change process, that is, from solid to liquid. These processes are carried out through a heat transfer process. During these processes, the control system that receives information about the position of the pistons, and two temperature and pressure sensors, each one placed in the capillary pipes of each secondary pipe in each circuit, obtain information on the temperature inside them and the external temperature. The function of the control system is for controlling the changes of state through the force unit 1, which controls the components and auxiliary equipment, for example, it controls the ventilation gates (40) so that the flow of cooled or heated air is expelled or introduced, through the ventilation duct (31) to a certain place, as the case may be. Also, for avoiding exceeding the maximum design pressure when the system stops, the control system will activate the relief valve or the like for releasing pressure.

Because $CO_2$ in its solid state, at that pressure, has a higher density than liquid $CO_2$, when the change from solid state to liquid state occurs, a volume change occurs depending on the pressure at which the $CO_2$ will be found in that phase change, and this change causes the system to absorb, and when the state change from liquid or partially liquid state to solid or partially solid state occurs, the system releases heat. That in this case the equipment has a thermal capacity for absorb or releasing 20,000 BTU/h.

This process is repeated continuously, throughout the day as required. The control system will control the initial $CO_2$ temperature, so that the desired temperature is reached. $CO_2$ will release heat when it solidifies and will absorb heat when it melts. All this absorbed or transferred heat will produce the state changes above mentioned.

The direction of the fans or the dampers (40) will be reversed for use in heating or cooling mode.

Example 6

Figure 11:
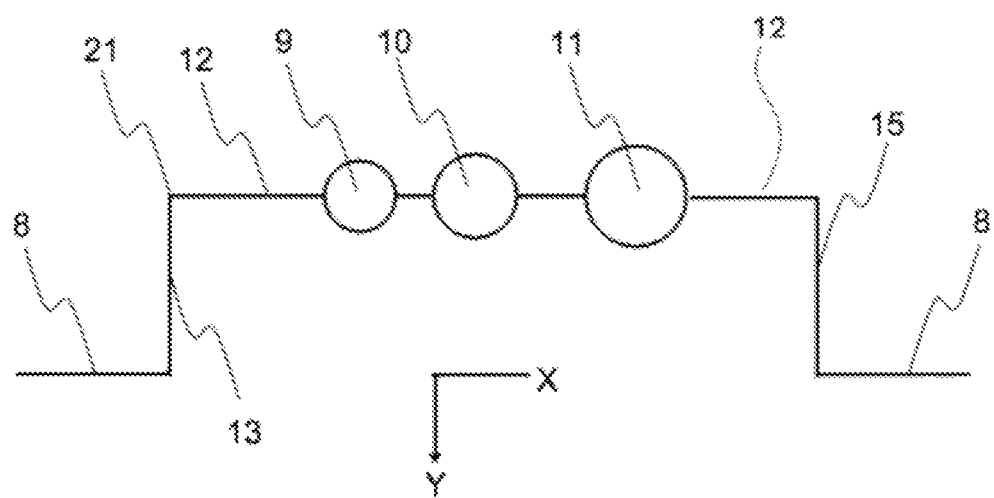
FIG. 11 shows a schematic plan view of an embodiment of the system for heat transfer according to the present invention.
Figure 12:
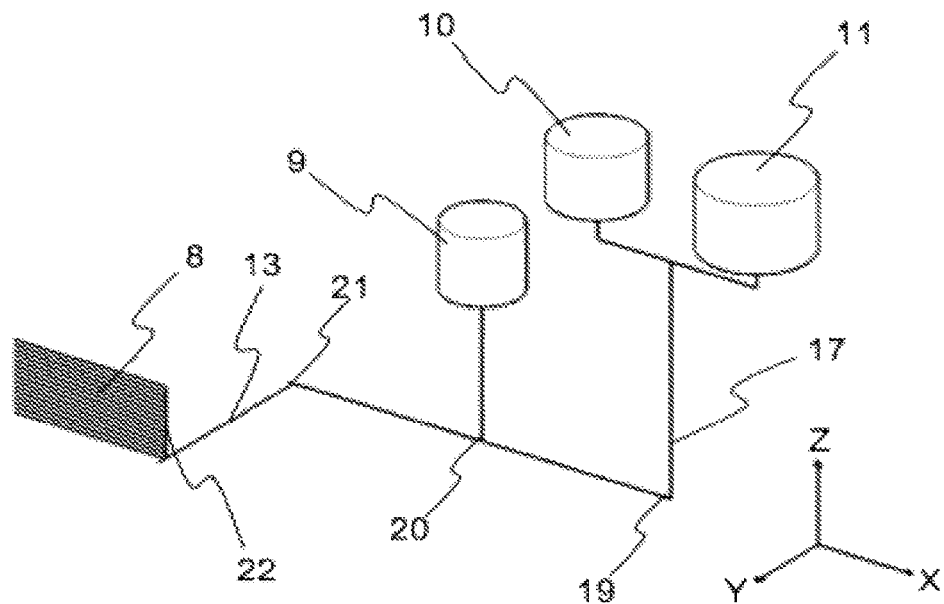
FIG. 12 shows a schematic perspective view of the system for heat transfer according to the present invention.
Figure 13:
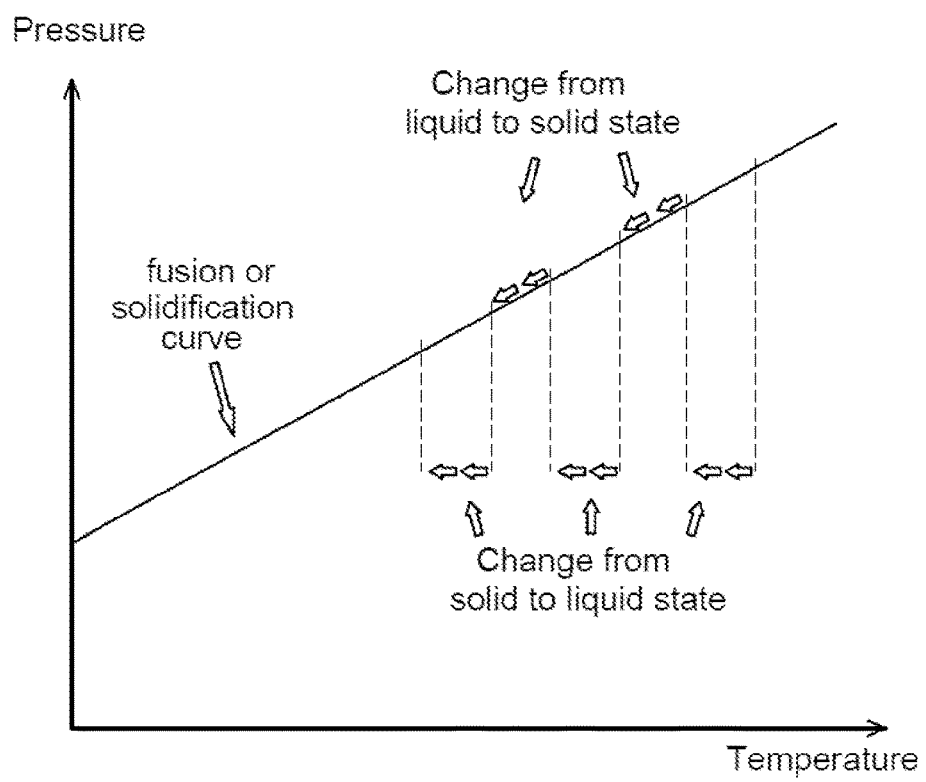
FIG. 13 shows a graph with the state change from solid to liquid and vice versa when the fluid is at a higher temperature than the ambient or medium temperature.
Figure 14:
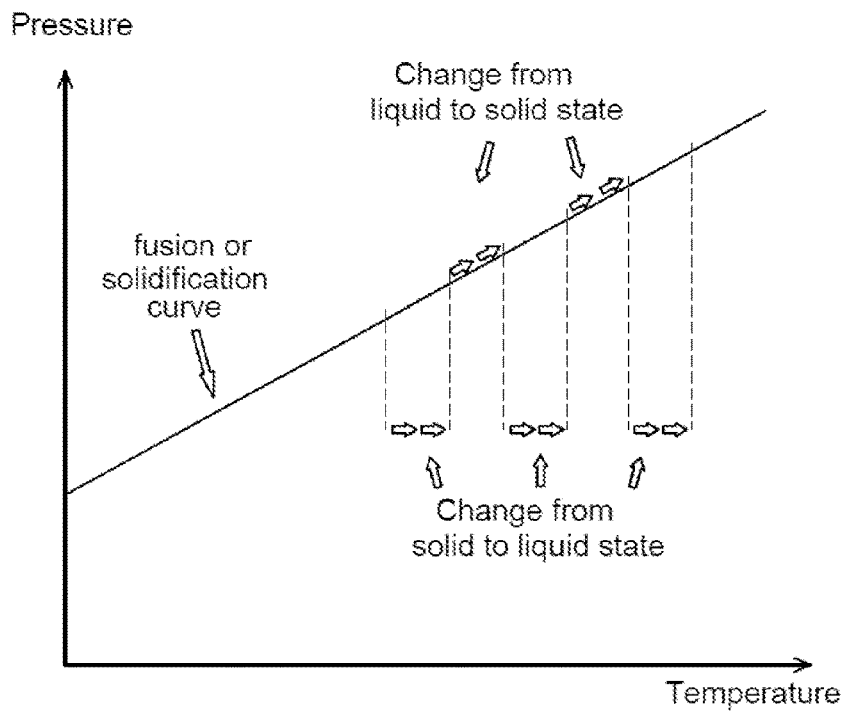
FIG. 14 shows a graph with the state change from solid to liquid and vice versa when the fluid is at a lower temperature than ambient or a medium temperature.

Four confined circuits are constructed consisting of steel pipes (FIG. 23 and FIG. 12), which will be the result of the Clausius-Clapeyron equation with a design pressure of 150 Mpa, for achieving solidification at the required temperature, the operating temperature for this case, will be configured for working with temperatures between 15° C. and 38° C., so the pressures, within the system for this example, will range between 0.001 and 150 Mpa. Each circuit is made up of a main pipe (12) of stainless steel, with an internal diameter of 3.5 mm and 1.7 mm thick, 2 meters long for circuits 1 and 2, and 3 meters for circuits 3 and 4. In each of its ends, hereinafter end (19), therein it is inserted into each of the main pipes (12) of circuit 1 and 2, a pipe (17) with an internal diameter of 3.5 mm, with a thickness of 1.7 mm and length 100 mm, that will connect each circuit to each side of a linear intensifier pump or the like (FIG. 11) hereinafter "the intensifier", which is part of the compressor or pump unit called force unit 1 (10) (FIG. 17), 482 mm long and 152 mm diameter, inside therein is a cylinder piston (2) that will move in both directions alternately, displaced by the alternative action of the fluid, in each circuit, that changes its volume as a consequence of its changes in state. The intensifier has a sensor allowing the entry of filling fluid to be controlled if necessary through a filling valve (33), and controlling the pressure through a relief valve and in this case a hydraulic pump (32) together with a directional control valve (29) and oilier typical elements for operating a linear intensifier pump (1) (FIG. 17), parts of force unit 1, that has a power of 500 W compressing the piston for changing the state of the fluid. At 0.1 meters from the end, called end (20) (FIG. 10), said end located at 1 meter from end (19), for this example it is connected to the control system (11), in addition the system is made up of four thermostats, four pressure switches, four fans (30) of 30 W each, hereinafter "auxiliary equipment".

At the end of the main pipe (12) of circuit 1, end (21) located at 2 meters from end (19) for this example, a first pipe (13) with an internal diameter of 3.5 mm, is connected, with a thickness of 1.7 mm and length 100 cm, wherefrom a manifold pipe (22) emerges (FIG. 12), which in this case, is a manifold, wherein a first plurality of pipes (8) or the like is connected. The manifold pipe (22) has an internal diameter of 3.5 mm, with a thickness of 1.7 mm and a length of 100 centimeters. The pipes (8) or the like, have an internal diameter of 2.8 mm and a thickness of 1.4 mm, in this case five pipes of 100 meters, which have a length of 500 meters in total, forming a coil of 100 centimeters long by 100 centimeters high, with circular aluminum fins connected to this coil with a separation of 3 mm between fins, and an external radius of 14 mm. The pipes (8) connected to this manifold pipe (22), which is connected to the first pipe (13), and which in turn is connected to the main pipe (12).

At the other end of the main pipe (12) of circuit 2, located at 2 meters from the end (19) for this example, a first pipe (15) is connected with an internal diameter of 3.5 mm, with a thickness of 1.7 mm and 100 cm long, wherefrom a manifold pipe (22) emerges, in this case, it is a manifold, wherein a first plurality of pipes (8) or the like is connected. The manifold pipe (22) has an internal diameter of 3.5 mm, with a thickness of 1.7 mm and a length of 100 centimeters. The pipes (8) or the like have an internal diameter of 2.8 ram and a thickness of 1.4 mm, in this case, five pipes of 100 meters, which have a length of 500 meters in total, forming a coil inserted into an exchanger (34), with dimensions of 100 centimeters long by 100 centimeters high, with circular aluminum fins connected to this coil, with a separation of 3 mm between fins, and an external radius of 14 mm. The pipes (8) connected to this manifold pipe (22), which is connected to the first pipe (15).

In this case (FIG. 23), the force unit 1 will be connected to circuits 1 and 2, and in the case of not using the same unit for controlling the pressure of all the circuits automatically, there will be a second force unit, called "force unit 2" having the same dimensions as force unit 1 and a power of 250 W, and which has pipes with the same dimensions as the pipes connected to force unit 1, except for manifold pipes (22) and (8), it will be connected to circuits 3 and 4 that have pipes (8) or the like, with an internal diameter of 3.5 mm, with a thickness of 1.7 mm, both force units will be connected and controlled by the control system (11).

In this example, a total of 5 pipes (8) are connected to each of the manifold pipes (22) of circuits 1, 2, 3 and 4, which are connected 96 mm apart from each other along the manifold pipe (22).

The pipes (8) of the force unit 2, in this case, five pipes of 50 meters, having a length of 250 meters in total for each circuit (circuit 3 and circuit 4), each circuit forming a coil inserted in a heat exchanger, with 100 centimeters long and 50 centimeters high, with circular aluminum fins connected to this coil, with a separation of 3 mm between fins and a radius of 14 mm, the pipes (8) are connected to the manifold pipe (22), which connects the circuit 3 and another that connects circuit 4, which have an internal diameter of 3.5 mm, a thickness of 1.7 mm and a length of 50 centimeters. Each of these circuits 1, 2, 3 and 4 is located inside a heat exchanger (34) forming a system such as in FIG. 23, a figure that shows a cascade system.

An organic or inorganic fluid called phase change material "PCM" is introduced into circuits 1 and 2, in this case designed for solidifying at a temperature of 28° C. at atmospheric pressure, hereinafter "PCM 1", and it is introduced into the circuits 3 and 4. An organic or inorganic fluid called phase change material for this case with a solidification temperature of 18° C. at atmospheric pressure, hereinafter "PCM 2", and subsequently force unit 1 and 2 compress both systems, removing all the air from it and remaining only PCM 1 and PCM 2, closing the free ends with a pipe plug.

Subsequently, in the case of using the equipment for cooling, and the ambient temperature is 33° C., with the help of force unit 1 and 2, the pressure in circuits 1 and 3 will be increased to 100 Mpa, at this time, the maximum design pressure is not required because the temperature that passes through the exchanger is not at the maximum design temperature, so it is not necessary the reaching of the maximum design pressure for causing the change of state, said compression starts when this circuit meets the maximum stroke of the piston, or the maximum volume of PCM stored in circuits 1 and 3 in a liquid state, then the respective force unit, in this case through the piston inserted in the linear pump, will compress the PCM until it solidifies, since along the increasing pressure, the PCM solidification curve is reached, the PCM temperature always being above the temperature at which it solidifies under atmospheric pressure, because if the PCM temperature were lower than its solidification temperature at atmospheric pressure, it would be solidified and the state change could not be carried out, so when the PCM is at a lower temperature than its solidification at atmospheric pressure, negative pressure is exerted or the internal pressure of the circuit is decreased at a pressure lower than atmospheric pressure, which produces its change of state. Heat transfer could occur in this example at temperatures of 17, 16, 15° C. or lower. While this occurs for the opposite circuits (circuit 2 and 4), the same piston of each respective force unit will be increasing the PCM volume of this circuit 2 and 4 (this occurs only in the first phase), since the filling valve or the similar of these circuits will be open to make PCM entering the circuit 2 and 4, subsequently the hydraulic cylinder piston of the respective force unit will compress circuit 2 and 4, increasing the pressure until the PCM of the second and fourth circuit solidifies.

As the PCMs in circuits 2 and 4 solidify, the PCMs in circuits 1 and 3 will be melting and vice versa.

Each circuit works the same way.

The force unit 1 and 2, in combination with the thermal process of heat transfer, varies the internal pressure of each circuit, and with it, the state changes of the PCM take place. The aforementioned process, together with the action of the components of the force unit 1 and 2, prevents the piston from returning and leaves it at its minimum point of travel, producing, during this contraction, compression, increase in pressure, the state change of the PCM from liquid to solid state, and during decompression or decrease of pressure, the state change from solid to liquid, for example, absorbing heat with the melting (solid to liquid) of the PCM in the pipes of circuits 1 and 3, and at that same moment, releasing heat with the transformation from liquid to solid of opposite circuits 2 and 4. As an example, the hydraulic pump (32) together with the motor (28), in this case electric of the respective force unit, they will exert the necessary force on the respective piston (27) for increasing the pressure of circuits 1 and 3 again and transform the PCM from liquid to solid, together with the pushing action of the opposite circuits on the piston (2) when it expands, pushes or balances, which will help greatly the force unit motor for working at a lower intensity, because there will generally be a base pressure in the opposite system, since it is not necessary to reach an atmospheric pressure for melting the PCM, so it will always be working with a pressure difference that will be less than the pressure difference between the required solidification pressure and the atmospheric pressure, in the case the temperature that passes through the heat exchangers is lower than the melting/solidification temperature of the PCM at atmospheric pressure, a pressure less than atmospheric will be used, therefore the direction of the forces will be reversed, so each circuit will be sucking the piston, for this to happen, the system will automatically draw a percentage of fluid, in this case PCM with the fill or filler valve (33) or the like, so that when the system is balanced, or the piston is in the center of the linear intensifier pump, both circuits will be at a pressure lower than atmospheric, with which what is achieved is that the temperature of melting/solidification is displaced at a temperature lower than the temperature at which the air or liquid that passes through the heat exchangers (circuits) will be found, and with this the system can exert pressure differences alternately, while the opposite circuits 2 and 4, simultaneously, will be carrying out the reverse state change process, that is, from solid to liquid. These processes are carried out through a thermal and mechanical heat transfer process. During these processes, the control system that receives information about the position of the pistons, and four temperature and pressure sensors, each placed in the pipes of each secondary pipe (8) in each circuit, obtain information on the temperature inside them and the external temperature. The function of the control system is for controlling the changes of state through force unit 1 and 2, for controlling the components and auxiliary equipment, for example, it controls the ventilation gates (40) (in this example located as shown in FIG. 23) so that in the case of cooling mode, the flow of hot air leaving the heat exchangers of circuits 1 and 2 is expelled, and the flow of cold air leaving the heat exchangers of circuits 1 and 2 go through the heat exchangers of circuits 3 and 4, so that subsequently a second gate introduces the cold air that comes out of circuits 3 and 4 through ventilation ducts (31) or the like, for this case, and expels the hot air from these circuits 3 and 4, to a certain place as the case may be. In addition, to avoid exceeding the maximum design pressure when the system stops, the control system will activate the relief valve or the like, for releasing pressure in each of the circuits.

The PCM in its solid state at that pressure in this case, has a higher density than the liquid PCM (it may also be the case of being a partially solid PCM, for example, a gel), when the state change occurs, solid to liquid state, a volume change of approximately between 3 to 5% occurs in this case, depending on the pressure at which the PCM will be in that phase change, and depending on the type of PCM, and this change produces that the system absorbs, and when the state change from liquid or partially liquid state to solid or partially solid state occurs, the system releases heat, which in this case has a thermal capacity for absorbing or releasing of 31,000 BTU/h, which yield a COP of 12 at high compression pressure loads and can reach a COP of 45 at low pressure loads, when the temperature is close to the state change temperature of the PCM, this is because, in the case of cooling, part of the energy absorbed by circuits 1 and 2 is lost when it passes through circuits 3 and 4, since there will be a circuit 3 or 4 that will be heating and expelling the air already cooled by circuits 1 and 2 to the exterior.

Optionally, for obtaining a greater temperature difference between the input and output of the equipment or system, obtaining 50% more cooling or heating capacity, but a performance coefficient "COP" (energy transferred or absorbed divided by consumption) approximately 30% lower, it is used circuits 1 and 2 with their respective force unit and replicate it four times (4 devices), called circuits 1, 2, 3, 4, 5, 6, 7, and 8, leaving two lines with two devices each, With this, when air or liquid passes through devices 1 and 2 (circuits 1, 2, 3, 4), alternately half of those circuits will be releasing and the other half absorbing heat, this heat transferred or absorbed, depending on whether it is requires cooling or heating, it will pass through only 1 device (in this case circuit 5 and 6) of the second line of 2 devices (circuit 5, 6, 7, 8), leaving the second device of line 2 in stop, this due to that the flow or stream that will pass will be half of the initial flow that goes through device 1 and 2. As a consequence, there is twice the temperature difference (cascade system), in addition of having 4 devices, the cascade system can be used in reverse and thus be able to heat, assuming that the temperature of fusion/solidification at atmospheric pressure of the fluids, in this case PCM is higher in line 1 and lower in line 2 of the devices. When used in heating or heating mode, the two devices in line two will be activated and one device of line 1 will be stopped. In the event that the temperature change state at atmospheric pressure of the fluid, in this case the PCM of line 1 is less than the PCM of line 2, it would have a flow in the opposite direction, for leaving it in heating mode (flow passes first through line 1 and then line 2). Also, in order to be more efficient in the number of force units to be used, so a smaller number of these can be used with a control system that can control the pressures of each circuit. The sizes can vary depending on the need to air conditioning.

This process is repeated continuously, throughout the day as required. The control system will control the initial pressure of the PCM and the speed of the fans so that the desired temperature is reached. The PCM will release heat when it solidifies and will absorb heat when it melts. All this absorbed or transferred heat will produce the state changes above mentioned as a result of the pressure variation.

The direction of the fans and the ventilation gates (40) will be reversed to be used in heating or cooling mode, so that in the case of heating, the air will pass through circuits 3 and 4 first, and then the heated air will pass through circuits 1 and 2.

This system can be used both for cooling or heating air, and also in the case of changing the fans for water pumps, to be able to cool or heat water or another liquid.

Only circuits 1 and 2 or only circuits 3 and 4 will be used in the event that such a high temperature variation is not required. Two force units can be used as mentioned in this example or a single unit which when compressing, compresses circuits 1 and 3 and subsequently circuits 2 and 4, this unit will have the same power as the sum of the power of the two force units above mentioned.

The cascade system can be used with force units and heat exchangers as in the diagrams shown in FIGS. 17, 19, 20 and 21, with different types of pumps including those mentioned in the specification but not limiting to those only.

Both an automated compressor can be used to perform different pressures on each circuit and one compressor per circuit.

In addition, the air in a place can be recirculated, and this recirculated air can pass through the circuits, causing a decrease in the air inside the place, which can be controlled with controlled ventilation.

Example 7

Two confined circuits are constructed consisting of copper pipes (FIG. 24 and FIG. 12)), which will be the result of the Clausius-Clapeyron equation with a design pressure of 100 Mpa, for achieving solidification at the required temperature, the operational temperature for this case will be configured for working with temperatures between 15° C. and 35° C., so the pressures within the system for this example will range between 0.01 and 100 Mpa, Each circuit is made up of a main copper pipe (12) with an internal diameter of 3.5 mm and 1.7 mm thick, 2 meters long for circuits 1 and 2. At each of its ends, hereinafter the end (19), each of the main pipes (12) of circuit 1 and 2 are inserted a pipe (17) with an internal diameter of 3.5 mm, with a thickness of 1.7 mm and a length of 50 mm, that will connect each circuit to each side of a directional control valve (38), and is connected to a plunger pump or the like (FIG. 11) hereinafter "the intensifier", which is part of the compressor or pump equipment called force unit 1 (10) (FIGS. 19 and 20), length 400 mm, height 400 mm and width 300 mm. The force unit has a sensor that allows the inflow fluid to be controlled, if necessary through a valve that makes the PCM enter the compartment, and control the pressure through a relief valve, and in this case the plunger pump (1) together with a directional control valve (38) and other typical elements operate force unit 1 with a power of 500 W, that compresses the fluid to change its state. At 0.1 meters from the end, called end (20) (FIGS. 10 and 11), said end located at 1 meters from end (19), for this example, it is connected to the control system (11), in addition the system is composed of four thermostats, four pressure switches, four fans (30) of 30 W each, hereinafter "auxiliary equipment".

At the end of the main pipe (12) of circuit 1, end (21) located at 2 meters from end (19) for this example, a first pipe (13) with an internal diameter of 3.5 mm is connected, with a thickness of 1.7 mm and length 100 cm, wherefrom a manifold pipe (22) emerges (FIG. 12), in this case, it is a manifold, wherein a first plurality of pipes (8) or the like are connected. The manifold pipe (22) has an internal diameter of 3.5 mm, with a thickness of 1.7 mm and a length of 100 centimeters. The pipes (8) or the like, have an internal diameter of 2.8 mm and a thickness of 1.4 mm, in this case, five pipes of 100 meters which have a length of 500 meters in total, forming a coil of 100 centimeters long by 100 centimeters high, with circular aluminum fins connected to this coil, with a separation of 3 mm between fins and an external radius of 14 mm. The pipes (8) connected to this manifold pipe (22), which is connected to the first pipe (13) and, in turn is connected to the main pipe (12).

At the other end of the main pipe (12) of circuit 2, located at 1 meters from the end (19) for this example, a first pipe (15) is connected, with an internal diameter of 3.5 mm, with a thickness of 1.7 mm and 100 cm long, wherefrom a manifold pipe (22) emerges, in this case, it is a manifold, wherein a first plurality of pipes (8) or the like are connected. The manifold pipe (22) has an internal diameter of 3.5 mm, with a thickness of 1.7 mm and a length of 100 centimeters. The pipes (8) or the like have an internal diameter of 2.8 mm and a thickness of 1.4 mm, in this case five pipes of 100 meters, which have a length of 500 meters in total, forming a coil inserted in an exchanger (34) with dimensions of 100 centimeters long by 100 centimeters high, with circular aluminum fins connected to this coil with a separation of 3 mm between fins and an external radius of 14 mm. The pipes (8) connected to this manifold pipe (22) and it is connected to the first pipe (15).

For this case (FIGS. 22 and 24), the force unit 1 will be connected to circuits 1 and 2, through a directional control valve (38), everything will be controlled by the control system (11).

In this example, a total of 5 pipes (8) are connected to each of the manifold pipes (22) of circuits 1 and 2, which are connected 96 mm apart from each other along the manifold pipe (22).

Each of these circuits 1 and 2 is located inside a heat exchanger (34) forming a system similar to the one in FIG. 24.

An organic or inorganic fluid called phase change material "PCM" is introduced into the circuits, in this case designed to solidify at a temperature of 12° C. at atmospheric pressure, hereinafter "PCM 1", and then the force unit compresses the system, removing all the air from it and leaving only the PCM, closing the free ends with a pipe plug.

Subsequently, in the case of using the equipment for cooling, and the temperature of the environment is at 33° C., with the help of force unit 1, the pressure in circuit 1 will be increased at 100 Mpa, said compression starts when this circuit meets the maximum volume of PCM stored in circuit 1, in a liquid state, then the respective force unit will compress the PCM through valve (38) until it solidifies, due to the increasing pressure reaching the solidification curve of the PCM always being the temperature of the PCM above the temperature at which it solidifies at atmospheric pressure, because if the temperature of the PCM were lower than its solidification temperature at atmospheric pressure, it would be solidified and the change of state could not be perform, so in the case of using a linear intensifier pump when the PCM is at a lower temperature than its solidification temperature at atmospheric pressure, negative pressure is exerted or the internal pressure of the circuit is decreased at a pressure lower than atmospheric pressure, which produces its change of state. Heat transfer may happen for this example at temperatures of 6, 8, 10° C. or lower. While this occurs for the opposite circuit (circuit 2) the valve (38) of the force unit will be increasing the volume of PCM of this circuit 2 (this occurs only in the first phase), then the respective force unit will compress the circuit 2 through valve (38), increasing the pressure until the PCM of the second circuit solidifies.

As the PCM in circuit 2 solidifies, the PCM in circuit 1 will be melting and vice versa.

Each circuit works the same way.

The force unit (FIG. 20) that has a power of 500 W, in combination with the thermal process of heat transfer, makes the internal pressure of each circuit vary, and with it the state changes of the PCM take place. The aforementioned process, in conjunction with the action of the components of the force unit, produces a contraction, compression, increase in pressure, the state change of the PCM from liquid to solid state, and during decompression or decrease in pressure, the state change from solid to liquid, for example, absorbing heat with the melting (solid to liquid) of the PCM in the pipes of circuit 1, and at that same moment releasing heat with the transformation from liquid to solid of the opposite circuit 2. As an example, the plunger pump (1) of FIG. 20 together with the valve (38) of the respective force unit, will alternately exert the necessary force for increasing the pressure of circuits 1 again and transforming the PCM from liquid to solid, while the valve (38) will release the pressure of the circuit 2, so it will make the opposite circuit 2, simultaneously, carrying out the inverse process of state change, that is, from solid to liquid. These processes are carried out through a thermal and mechanical heat transfer process. During these processes, the control system that receives information from two temperature and pressure sensors, each placed in the pipes of each secondary pipe (8) in each circuit, obtain information on the temperature inside them and the external temperature. The function of the control system is the controlling of the state changes through the power unit, for controlling the components and auxiliary equipment, for example, it controls the ventilation gates (40) (in this example located as shown in FIG. 24), so that in the case of cooling mode, the flow of hot air leaving the heat exchanger of circuit 1 or 2 when its PCM is solidifying, is expelled and the flow of cold air leaving the heat exchanger of circuit 1 or 2 when its PCM is melting, is introduced into a ventilation duct (31). Furthermore, for avoiding transferring the maximum design pressure when the system stops, the control system will cause the valve (38) or the like, to release pressure in each of the circuits.

The PCM in its solid state at that pressure in this case, has a higher density than the liquid PCM (it may also be the case of being a partially solid PCM, for example a gel), when the state change occurs, solid to liquid state, a volume change of approximately 5 to 8% occurs in this case, depending on the pressure that the PCM will be in during that phase change, and depending on the type of PCM, and this change produces that the system absorbs, and when the change from a liquid or partially liquid state to a solid or partially solid state occurs, the system releases heat, which in this case has a thermal capacity for absorbing or releasing 5,000 BTU/h.

This process is repeated continuously, throughout the day as required. The control system will control the initial pressure of the PCM and the speed of the fans, so that the desired temperature is reached. The PCM will release heat when it solidifies and will absorb heat when it melts. All this absorbed or transferred heat will produce the state changes above mentioned as a result of the pressure variation.

The direction of the ventilation gates (40) will be reversed for use in heating or cooling mode.

The system can be used with force units and heat exchangers as in the diagrams shown in FIGS. 17, 19, 20 and 21, with different types of pumps including those mentioned in the specification but not limiting to those only.

Example 8

Two confined circuits are constructed consisting of copper pipes (FIG. 21 and FIG. 12)), which will be the result of the Clausius-Clapeyron equation with a design pressure of 100 Mpa, for achieving solidification at the required temperature, the operational temperature for this case will be configured to work with temperatures between 18° C. and 36° C., so the pressures within the system for this example will range between 0.001 and 100 Mpa. Each circuit is made up of a main copper pipe (12) with an internal diameter of 3.5 mm and 1.7 mm thick, 2 meters long for circuits 1 and 2. At each of its ends, hereinafter the end (19), each of the main pipes (12) of circuit 1 and 2 are inserted a pipe (17) with an internal diameter of 3.5 mm, with a thickness of 1.7 mm and a length of 50 mm, that will connect each circuit to each side of a directional control valve, and is connected to a linear intensifier pump or the like (FIG. 11) hereinafter "the intensifier", which is part of the compressor or pump equipment called force unit (10) (FIG. 21), of length 582 mm and diameter 170 mm. The force unit has a sensor that allows the inflow fluid to be controlled if necessary through a valve that makes the PCM enter a compartment, and control the pressure through a relief valve, and in this case the linear intensifier pump (1) together with a directional control valve or the like (38) and other typical elements operating the force unit 1, that compresses the fluid to change its state. At 0.1 meters from the end, called end (20) (FIGS. 10 and 11), said end located at 1 meters from end (19), for this example it is connected to the control system (11), in addition the system is composed of four thermostats, four pressure switches, hereinafter "auxiliary equipment".

At the end of the main pipe (12) of circuit 1, end (21) located at 2 meters from end (19) for this example, a first pipe (13) with an internal diameter of 3.5 mm is connected, with a thickness of 1.7 mm and length 100 cm, wherefrom a manifold pipe (22) emerges (FIG. 12), in this case, it is a manifold, wherein a first plurality of pipes (8) or the like are connected. The manifold pipe (22) has an internal diameter of 3.5 mm, with a thickness of 1.7 mm and a length of 100 centimeters. The pipes (8) or the like, have an internal diameter of 2.8 mm and a thickness of 1.4 mm, in this case five pipes of 100 meters which have a length of 500 meters in total, forming a coil of 100 centimeters long by 100 centimeters high, with circular aluminum fins connected to this coil with a separation of 3 mm between fins and an external radius of 14 mm. The pipes (8) are connected to this manifold pipe (22), which is connected to the first pipe (13), and in turn is connected to the main pipe (12).

At the other end of the main pipe (12) of circuit 2, located at 1 meters from the end (19) for this example, a first pipe (15) is connected with an internal diameter of 3.5 mm, a thickness of 1.7 mm and 100 cm long, wherefrom a manifold pipe (22) emerges, in this case, it is a manifold, wherein a first plurality of pipes (8) or the like is connected. The manifold pipe (22) has an internal diameter of 3.5 mm, with a thickness of 1.7 mm and a length of 100 centimeters. The pipes (8) or the like have an internal diameter of 2.8 mm and a thickness of 1.4 mm, in this case five pipes of 100 meters which have a length of 500 meters in total, forming a coil inserted into a heat exchanger (34) with dimensions of 100 centimeters long by 100 centimeters high, with circular aluminum fins connected to this coil, with a separation of 3 mm between fins and an external radius of 14 mm. The pipes (8) are connected to this manifold pipe (22), which is connected to the first pipe (15).

In this case, the force unit 1 will be connected to circuits 1 and 2, through a directional control valve (38), everything will be controlled by the control system (11).

In this example, a total of 5 pipes (8) are connected to each of the manifold pipes (22) of circuits 1 and 2, which are connected 96 mm apart from each other along the manifold pipe (22).

Each of these circuits 1 and 2 are located inside a heat exchanger (34) forming a system similar to the one in FIG. 21.

An organic or inorganic fluid called phase change material "PCM" is introduced into the circuits, in this case designed to solidify at a temperature of 27° C. at atmospheric pressure, hereinafter "PCM 1", and then the force unit compresses the system, removing all the air from it and leaving only the PCM, closing the free ends with a pipe plug.

Subsequently, in the case of using the equipment for cooling water or other liquid, and its temperature is 36° C., with the help of force unit 1, the pressure in circuit 1 will be increased at 100 Mpa, said compression starts when this circuit meets the maximum volume of PCM stored in circuit 1 in a liquid state, then the respective force unit will compress the PCM through valve (38) until it solidifies, due to the fact that when it increases the pressure, it reaches the solidification curve of the PCM, being always the PCM temperature above the temperature at which it solidifies at atmospheric pressure, because if the temperature of the PCM were lower than its solidification temperature at atmospheric pressure, it would be found solidified and the state change would not be carried out, so in the case of using the linear intensifier pump or another, when the PCM is at a lower temperature than its solidification temperature at atmospheric pressure, a negative pressure is exerted or the internal pressure of the circuit is decreased at a pressure lower than atmospheric pressure, which produces its change of state. Heat transfer may happen for this example at temperatures of 24, 22, 20° C. or lower. While this occurs for the opposite circuit (circuit 2) the valve (38) of the force unit will be open and will enter PCM, so the volume of PCM of this circuit 2 will be increasing (this occurs only in the first phase) Subsequently, the respective force unit will compress circuit 2 through valve (38), increasing the pressure until the PCM of the second circuit solidifies.

As the PCM in circuit 2 solidifies, the PCM in circuit 1 will be melting and vice versa.

Each circuit works the same way.

The force unit (FIG. 21) that has a total power of 300 W including the power of the pump, in combination with the thermal process of heat transfer, varies the internal pressure of each circuit, and thus state changes of the PCM. The aforementioned process, together with the action of the components of the force unit, produces a contraction, compression, increase in pressure, the state change of the PCM from liquid to solid state, and during decompression or decrease in pressure, the state change from solid to liquid, for example, absorbing heat with the melting (solid to liquid) of the PCM in the pipes of circuit 1, and at that same moment releasing heat with the transformation from liquid to solid of the opposite circuit 2. As an example, the linear intensifier pump (1) of FIG. 21, together with the valve (38) of the respective force unit, will exert alternately the necessary force for increasing the pressure of circuits 1 again, and transforming the PCM from liquid to solid, while the valve (38) will release the pressure of circuit 2, so it will make the opposite circuit 2, simultaneously, be carrying out the reverse process of state change, that is, from solid to liquid, the valve (38) will re-enter the PCM that is being decompressed to the linear intensifier pump or the like (1). These processes are carried out through a thermal and mechanical heat transfer process. During these processes, the control system that receives information from two temperature and pressure sensors, each placed in the pipes of each secondary pipe (8) in each circuit, obtain information on the temperature inside them and the external temperature. The function of the control system is controlling the state changes through the power unit, for controlling the components and auxiliary equipment, for example, it controls the directional control valves or the like (37) that will control the destination of the cooled fluid or heated, being able to be water, in this example located as shown in FIG. 21 so that in the case of cooling mode the flow of hot liquid leaving the heat exchanger of circuit 1 or 2 when its PCM is solidifying, is entered a cooling tower type heat exchanger or the like, (42) that will cool it down at room temperature, and then re-enter it, and the flow of cold liquid leaving the heat exchanger of circuit 1 or 2 when its PCM is melting, will be introduced into a pipe for its subsequently use (41) and if necessary, when it has been reheated, it will be reintroduced. Furthermore, for avoiding transferring the maximum design pressure when the system stops, the control system will cause the valve (38) or the like to release pressure in each of the circuits.

The PCM in its solid state at that pressure in this case, has a higher density than the liquid PCM (it may also be the case of being a partially solid PCM, for example a gel), when the state change occurs, solid to liquid state, a volume change of approximately 5 to 8% occurs in this case, depending on the pressure that the PCM will be in during that phase change, and depending on the type of PCM, and this change produces that the system absorbs, and when the change from a liquid or partially liquid state to a solid or partially solid state occurs, the system releases heat, which in this case, it has a thermal capacity of absorbing or releasing 20,000 BTU/h. Which results in a COP (coefficient of performance) of 20 and it can reach a low compression load when the temperature is close to the state change temperature, at a COP of 50.

This process is repeated continuously, throughout the day as required. The control system will control the initial pressure of the PCM and the speed of the fluid for cooling or heating as required, through hydraulic pumps that do not necessarily are part of this equipment, in order to reach the desired temperature. The PCM will release heat when it solidifies and will absorb heat when it melts. All this absorbed or transferred heat will produce the state changes above mentioned as a result of the pressure variation.

The directional control valve (37) will be reversed for use in heating or cooling mode of the water or fluid.

The system can be used with force units and heat exchangers, as in the diagrams shown in FIGS. 17, 19, 20 and 21, with different types of pumps including those mentioned in the specification but not limiting to those only.

This equipment as well as anyone who uses this method and system may optionally be used for cooling the air that passes through a condenser or evaporator, as the case may be, used by current equipment, such as the temperature of the air flow that passes through it, is decreased or increased, and with this decrease, the consumption of a common air conditioning equipment, since the load is decreased.

In addition, it can also work using the current air conditioning equipment as a support, so that at certain temperature ranges, the current ones work, and in other ranges, this method and system work.

A pressure intensifier can also be used in the equipment to be able to use a pump with a lower pressure. The intensifier fulfills the function of increasing the pressure, and thus there will be fewer components that operate at high pressures, also with this, in the case of using a pump that does not have the linear intensifier, two fluids can be separated, this means a fluid that can be a hydraulic oil that would be used in the pump, and at the other end of the intensifier a fluid could be the PCM.

[1] Revised Release on the Pressure along the Melting and Sublimation Curves of Ordinary Water Substance IAPWS R14-08 (2011) http://www.iapws.org.
[2] M. Choukrounia and O. Grasset, Thermodynamic model for water and high-pressure ices up to 2.2 GPa and down to the metastable domain, J. Chem. Phys. 127 (2007) 124506.
[3] M. P. Verma, Steam tables for pure water as an ActiveX component in Visual Basic 6.0, Computers Geosci. 29 (2003) 1155-1163.
[4] D. Eisenberg and W. Kauzmann, The structure and properties of water (Oxford University Press, London, 1969); (b) The dodecahedral interstitial model is described in L. Pauling, The structure of water, In Hydrogen bonding, Ed. D. Hadzi and H. W. Thompson (Pergamon Press Ltd, London, 1959) pp. 1-6.
[5] Equations of state of ice VI and ice VII at high pressure and high temperature citation The journal of chemical physics 141, 104505 (2014)).
[6] Time-resolved x-ray diffraction across water-ice-VI/VII transformations using the dynamic-DAC.
[7] N. H. Fletcher, In The Chemical Physics of Ice, (Cambridge University Press; 1970).
[8] G. C. León, S. Rodriguez Romo and V. Tchijov, Thermodynamics of high-pressure ice polymorphs: ice II, Journal of Physical Chemistry Solids 63 (2002) 843-851.
[9] Formulations for vapor pressure, frostpoint temperature, dewpoint temperature, and enhancement factors in the range −100 to +100 C, Bob Hardy.
[10] Requena Rodríguez, Alberto; Zuñiga Roman, José. Physical Chemistry. 1st Edition 2007.
[11] MORCILLO RUBIO, Jesus; SENENT PÉREZ and others: Physical Chemistry. 2nd Edition 2000.

The invention claimed is:

1. A system for producing heat transfer between two or more media in a closed circuit, for an HVAC system for air conditioning a space, with low energy consumption, for household, commercial or industrial use, comprising:
  (a) a cylinder (1), which comprises in its interior at least one piston (2) which is joined to a plunger (27), the plunger (27) being moved alternatingly under the actuation of a directional control valve (29) which receives a hydraulic fluid from a hydraulic pump (32);
  (b) a first closed chamber connected to the cylinder (1), said first closed chamber being connected to a first confined pipeline circuit configured to receive a thermal working fluid, wherein the first confined pipeline circuit comprises one or more pipes in order for forming the first confined pipeline circuit, wherein the first confined pipeline circuit is closed at one of its ends, wherein the thermal working fluid is compressed in said first closed chamber and said first confined pipeline circuit, producing a change from the liquid to the solid state or vice versa or from a solid state to another solid state or vice versa;
  (c) a second closed chamber, said second closed chamber being connected to a second confined pipeline circuit configured to receive thermal working fluid, wherein the second confined pipeline circuit comprises one or more pipes in order for forming the second confined pipeline circuit, wherein the second confined pipeline circuit is closed at one of its ends, wherein the thermal working fluid is compressed in said second closed chamber and said second confined pipeline circuit, producing a change from the liquid to the solid state or vice versa or from a solid state to another solid state or vice versa;
  (d) a control system (11) adapted to alternatingly increase and decrease a pressure in the first and in the second closed chambers by regulating an actuation of the directional control valve (29), wherein said heat transfer system further comprises:
  (e) a first heat exchanger (34), which is formed by the one or more pipes of first confined pipeline circuit connected to the first closed chamber in which working fluid is arranged when changing from the liquid to the solid state or vice versa or from a solid state to another solid state or vice versa; and
  (f) a second heat exchanger (34), which is formed by one or more pipes of the second confined pipeline circuit connected to the second closed chamber in which working fluid is arranged when changing from the liquid to the solid state or vice versa or from a solid state to another solid state or vice versa;
  wherein the control system is further adapted to repeatedly regulate the actuation of the directional control valve until a desired temperature of the space to be air conditioned is reached;
  further comprising:

a first filling valve (33) fluidly connected to the pipe connected to the first closed chamber for entering and withdrawing thermal working fluid from the first heat exchanger, the first closed chamber and the cylinder, and a second filling valve (33) fluidly connected to the pipe connected to the second closed chamber for entering and withdrawing thermal working fluid from the second heat exchanger, the second closed chamber and the cylinder, wherein the first filling valve is fluidly connected to the second filing valve, allowing to enter thermal working fluid withdrawn from the first confined pipeline circuit or the first closed chamber to the second confined pipeline circuit or the second closed chamber and vice versa.

2. The system for producing heat transfer according to claim 1, wherein the pipes are capillary tubes.

3. The system for producing heat transfer according to claim 1, wherein the pipes have an internal diameter of between 0.5 mm and 6 mm.

4. The system for producing heat transfer according to claim 1, wherein said the at least one piston (2) is part of a force unit (10);

wherein the (11) control system is adapted for controlling state changes of an auxiliary equipment selected from a group consisting of heaters, coolers, radiators, thermostats and humidifiers.

5. The system for producing heat transfer according to claim 1, wherein said system further comprises a fan (30) for improving heat transfer.

6. The system for producing heat transfer according to claim 1, wherein said system further comprises ventilation gates (40), which control the flow of air entering the ventilation ducts (31).

7. The system for producing heat transfer according to claim 5, wherein the direction of the fans is reversed in order to use the heat transfer system in the heating or cooling mode.

8. The system for producing heat transfer according to claim 1, wherein the hydraulic pump (32) is actuated by an electric motor (28).

9. The system for producing heat transfer according to claim 1, wherein said system further comprises unidirectional valves (26), which are actuated electronically and connected to the cylinder (1) to prevent the piston (2) from returning.

10. The system for producing heat transfer according to any one of claims 1, 4, 5, 8, and 9, wherein the directional control valve (29) which receives a hydraulic fluid from a hydraulic pump (32), the fan (30), the electric motor (28), the unidirectional valves (26) and the fill valves (33) are connected to the control system (11).

11. A method for producing heat transfer between two or more media in a closed circuit, for an HVAC system for air conditioning a space, with low energy consumption, for household, commercial or industrial use, comprising:

(a) introducing a thermal working fluid into a first closed chamber connected to a cylinder (1), said first closed chamber being connected to at least a first confined pipeline circuit which comprises one or more pipes in order for forming the first confined pipeline circuit, wherein the first confined pipeline circuit is closed at one of its ends; and introducing said thermal working fluid into a second closed chamber being connected to a second confined pipeline circuit which comprises one or more pipes in order for forming the second confined pipeline circuit, wherein the second confined pipeline circuit is closed at one of its ends;

(b) compressing the thermal working fluid in said first closed chamber and the first confined pipeline circuit connected to the first closed chamber by means of a cylinder (1), which comprises in its interior at least one piston (2) which is joined to a plunger (27), the plunger (27) being moved alternatingly under the actuation of a directional control valve (29), which receives a hydraulic fluid from a hydraulic pump (32);

(c) regulating the actuation of the directional control valve (29) via a control unit (11), wherein said method further comprises the steps of:

(d) producing the change of state of the thermal working fluid in the first closed chamber, from liquid to solid or vice versa or from a solid state to another solid state or vice versa by virtue of the pressure increase, yielding or delivering heat to a heat exchanger (34) formed by the one or more pipes of the first confined pipeline circuit connected to the first closed chamber in which working fluid is arranged when changing from the liquid to the solid state or vice versa or from a solid state to another solid state or vice versa;

(e) decompressing the thermal working fluid in said first closed chamber and the first confined pipeline circuit connected to the first closed chamber in order to re-induce the change of state by virtue of the drop in pressure;

(f) repeating step (b) through step (e) until the desired temperature is attained in the household, commercial or industrial space to be air conditioned;

the method further comprising:

(i) compressing the thermal working fluid in said second closed chamber and the second confined pipeline circuit connected to the second closed chamber;

(ii) producing the change of state of the thermal working fluid in the second closed chamber, from liquid to solid or vice versa or from a solid state to another solid state or vice versa by virtue of the pressure increase, yielding or delivering heat to a second heat exchanger (34) formed by one or more pipes of the second confined pipeline circuit connected to the second closed chamber in which working fluid is arranged when changing from the liquid to the solid state or vice versa or from a solid state to another solid state or vice versa;

(iii) decompressing the thermal working fluid in said second closed chamber and the second confined pipeline circuit connected to the second closed chamber in order to re-induce the change of state by virtue of the drop in pressure;

wherein the method further comprising entering or withdrawing thermal working fluid via a first filling valve (33) which is fluidly connected with said first confined pipeline circuit, and entering or withdrawing thermal working fluid via a second filling valve (33) which is fluidly connected with said second confined pipeline circuit, wherein the first filling valve is fluidly connected to the second filing valve, allowing to enter thermal working fluid withdrawn from the first confined pipeline circuit or the first closed chamber to the second confined pipeline circuit or the second closed chamber and vice versa.

12. The system for producing heat transfer according to claim 1, wherein the system further comprising a first relief valve and a second relief valve, wherein the control system (11) is adapted to control the first relief valve and the second relief valve for controlling the pressure in the first confined pipeline circuit connected to the first closed chamber and the second confined pipeline circuit connected to the second closed chamber, respectively.

13. The method according to claim 11, further comprising controlling the pressure in the first confined pipeline circuit connected the first closed chamber and the cylinder using a first relief valve, and/or controlling the pressure in the second confined pipeline circuit connected the second closed chamber and the cylinder using a second relief valve.

* * * * *